(12) United States Patent
Peters

(10) Patent No.: US 6,918,949 B1
(45) Date of Patent: Jul. 19, 2005

(54) METHOD FOR CONTACTING LARGE VOLUMES OF GAS AND LIQUID ACROSS MICROSCOPIC INTERFACES

(75) Inventor: Janet K. Peters, Houston, TX (US)

(73) Assignee: Jaeco Technology, Inc., Houston, TX (US)

(*) Notice: Subject to any disclaimer, the term of this patent is extended or adjusted under 35 U.S.C. 154(b) by 0 days.

(21) Appl. No.: 10/981,718

(22) Filed: Nov. 5, 2004

Related U.S. Application Data

(62) Division of application No. 10/351,629, filed on Jan. 27, 2003, now Pat. No. 6,830,608.

(60) Provisional application No. 60/392,498, filed on Jun. 28, 2002.

(51) Int. Cl.[7] ............................. B01D 19/00; B01F 3/04
(52) U.S. Cl. ............................. 95/185; 95/217; 95/219; 95/261; 96/202; 96/209; 96/216; 261/79.2; 261/122.1
(58) Field of Search .................. 95/185, 217–219, 95/260–262; 96/272–274, 301, 326, 202, 96/208, 209, 216; 261/79.2, 112.1, 122.1

(56) References Cited

U.S. PATENT DOCUMENTS

| | | | | |
|---|---|---|---|---|
| 3,233,389 A | * | 2/1966 | Dahlen | 95/198 |
| 3,274,752 A | * | 9/1966 | Huyghe et al. | 261/128 |
| 3,296,774 A | * | 1/1967 | Hoogendoorn et al. | 95/219 |
| 3,633,342 A | * | 1/1972 | Richardson | 96/319 |
| 3,733,786 A | * | 5/1973 | Koka | 96/314 |
| 4,279,743 A | * | 7/1981 | Miller | 209/731 |
| 4,397,741 A | * | 8/1983 | Miller | 209/170 |
| 4,399,027 A | * | 8/1983 | Miller | 209/164 |
| 4,464,309 A | * | 8/1984 | Linhardt | 261/23.1 |
| 4,744,890 A | * | 5/1988 | Miller et al. | 209/164 |
| 4,755,198 A | * | 7/1988 | Darton | 96/301 |
| 4,838,434 A | * | 6/1989 | Miller et al. | 209/164 |
| 4,997,549 A | * | 3/1991 | Atwood | 209/164 |
| 5,445,801 A | * | 8/1995 | Pisoni | 422/197 |
| 5,472,567 A | * | 12/1995 | Torregrossa | 162/6 |
| 5,529,701 A | * | 6/1996 | Grisham et al. | 210/787 |
| 5,531,904 A | * | 7/1996 | Grisham et al. | 210/703 |
| 5,591,347 A | * | 1/1997 | Cairo et al. | 210/703 |

(Continued)

OTHER PUBLICATIONS

B. Waldie, A New High Intensity Contactor For Deoxygenation Of Water, Trans IChemE, vol. 74, Part A, Mar. 1996.*

*Primary Examiner*—Richard L. Chiesa
(74) *Attorney, Agent, or Firm*—Kenneth A. Roddy

(57) ABSTRACT

A method for contacting large volumes of gas and liquid together on a microscopic scale for mass transfer or transport processes wherein the contact between liquid and gas occurs at the interfaces of a multitude of gas bubbles. Multiple porous tubes assembled in a bundle inside a pressure vessel terminate at each end in a tube sheet. A thin film helical liquid flow is introduced into the inside of each porous tube around and along its inside wall. Gas is sparged into the porous media and the liquid film so that an annular two phase flow with a uniform distribution of tiny gas bubbles results. The gas flow is segregated from the liquid flow without first passing through the porous media and through the liquid film. Nozzles at the lower end of the tubes divert liquid flow to a vessel and redirect the gas flow in a countercurrent direction.

12 Claims, 17 Drawing Sheets

U.S. PATENT DOCUMENTS

| | | | |
|---|---|---|---|
| 5,662,811 A * | 9/1997 | Grisham et al. | 210/788 |
| 5,730,875 A * | 3/1998 | Grisham et al. | 210/638 |
| 5,833,888 A * | 11/1998 | Arya et al. | 261/112.1 |
| 5,935,283 A * | 8/1999 | Sweeney et al. | 55/431 |
| 6,004,386 A * | 12/1999 | Grisham et al. | 96/202 |
| 6,767,007 B2 * | 7/2004 | Luman | 261/76 |
| 6,830,608 B1 * | 12/2004 | Peters | 96/272 |

* cited by examiner

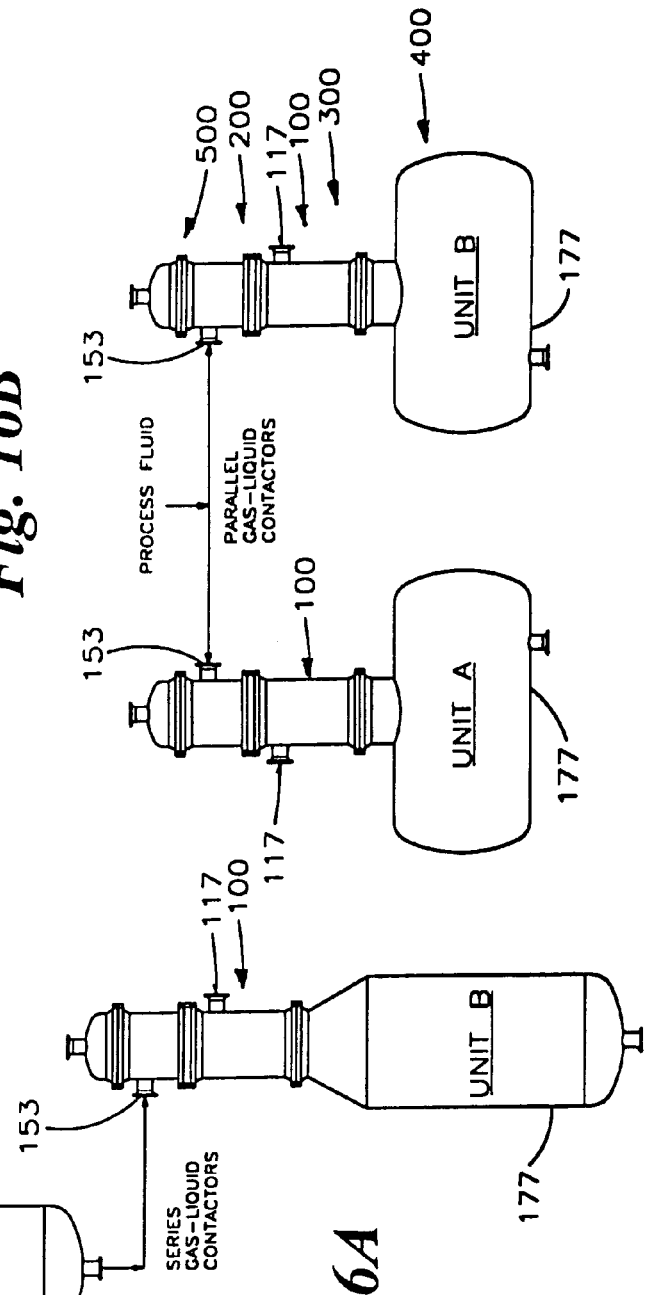
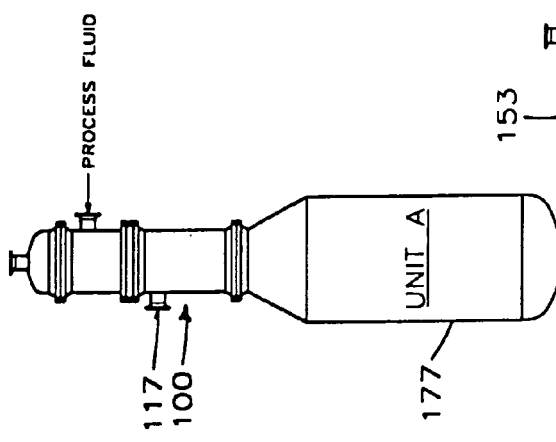
Fig. 16B
Fig. 16A

METHOD FOR CONTACTING LARGE VOLUMES OF GAS AND LIQUID ACROSS MICROSCOPIC INTERFACES

CROSS REFERENCE TO RELATED APPLICATION

This application is a divisional of and claims priority of application Ser. No. 10/351,629, filed on Jan. 27, 2003, now U.S. Pat. No. 6,830,608, which claims priority of U.S. Provisional Application Ser. No. 60/392,498, filed Jun. 28, 2002.

BACKGROUND OF THE INVENTION

1. Field of the Invention

This invention relates generally to apparatus and methods for creating and maintaining controlled mass transfer, heat transfer, or chemical reactions, and more particularly to an apparatus and method for contacting industrial volumes of gas and liquid phases in close microscopic scale proximity with each other for the purpose of creating and maintaining controlled mass transfer, heat transfer, or chemical reaction to achieve a particular process.

2. Brief Description of the Prior Art

A wide variety of industrial operations depend on contacting a gas and a liquid together to achieve a process. These operations can generally be categorized by transport phenomenon where two (2) or more components in a system having a gradient will naturally equilibrate. Gradients occur in the system due to differing concentrations, temperatures, or simply by differences in energy or motion between the components being brought into contact each with the other. Where the gradient is concentration, the transport is either by molecular mass transfer or convective mass transfer or both. In the cases where there are chemical interactions between the components, the transport equilibria may or may not be over shadowed by the driving force of chemical equilibrium. In general, these complex interactions which occur by contacting gas and liquid together can be categorized by the common terms mixing, stripping, evaporation, absorption, reaction, etc.

The literature dealing with mass transfer generally suggests that molecular mass transfer by diffusion plays a significant role even in a fast moving system regardless of whether the system is chemically reactive or non-reactive. Diffusion occurs across spatially separated components due to a natural tendency to equilibrate. Depending on the system of interest, the process may be limited by the diffusivity or by time. Diffusion may be vastly improved by minimizing the spatial distance between components. Contacting large volumes of gas and liquid together in conventional equipment generally involves creating the largest amount of liquid surface area by whatever means attainable in a limited volume. The result of this approach is most often a tall tower containing either trays or packing material where the liquid is sprayed into a gas phase or the gas is bubbled into the bulk liquid phase. In either case, the spatial separation between components is improved, but the overall volume required to accomplish the contact conditions on a commercial scale can be quite large.

An obvious parameter necessary for either approach to tower design is the acceleration of the components due to earth's gravity. Tower bubble trays containing liquid rely on gravity to keep the liquid in the trays. Spray towers rely on gravity to accelerate liquid droplets downward. It is clear that neither method would work well in the absence of gravitational acceleration. For this reason and others, tower design is typically a large volume, low energy method for creating gas-liquid contactors.

Miller, U.S. Pat. Nos. 4,279,743; 4,397,741; 4,399,027; and Miller et al, U.S. Pat. Nos. 4,744,890 and 4,838,434 disclose air sparged hydrocyclone apparatus (ASH unit) primarily for use as a type of air flotation device for removing particulate matter from a liquid.

Atwood, U.S. Pat. No. 4,997,549 discloses an apparatus and method utilizing an air sparged hydrocyclone apparatus (ASH unit) for separating hydrophilic particles from a fluid suspension containing both hydrophilic and hydrophobic particles.

Grisham et al, U.S. Pat. Nos. 5,529,701; 5,531,904; 5,662,811; 5,730,875, and 6,004,386 disclose a compact, high energy apparatus and method for contacting gas and liquid (the group of patents being hereinafter referred to as the "Grisham, et al Patents"). The "Grisham, et al Patents" are based on accelerating a thin film of liquid in helical flow pattern around and along the inside walls of a microscopically porous tube and sparging gas into the outside of the tube causing the gas to also pass through the thin liquid film. The goal central to these references is to decrease the diffusion distance between components by creating closely spaced gas bubbles in a fast moving liquid so that gas-liquid interfaces are abundantly available for mass transfer equilibrium to occur in a time as near instantaneously as is possible.

U.S. Pat. Nos. 5,529,701; 5,531,904; 5,662,811; 5,730,875, and 6,004,386, (the "Grisham, et al Patents"), in which the inventor of the present invention was also a co-inventor, are hereby incorporated by reference to the same extent as if fully set forth herein.

Cairo, Jr. et al, U.S. Pat. No. 5,591,347 discloses a simplified single cell apparatus and method for removal of suspended impurities in liquids using gas flotation and filtration. The method and apparatus are preferably directed toward induced gas flotation separation of suspended impurities in combination with a filter media for filtration removal of remaining suspended impurities. A filter media is contained within the single cell apparatus such that liquid exiting the vessel must pass through the filter media after having been subjected to flotation treatment.

A foreign treatise written on a compact, high intensity gas/liquid contactor, "Stripping Performance of a New High Intensity Gas/Liquid Contactor", B. Waldie and W. K. Harris, Dept Mechanical and Chemical Engineering, Heriot-Watt University, Edinburgh, UK exists in the literature. A complete reference for this work is not known, but it appears to have been the culmination of a funded research supported by the UK EPSRC and several oil operating companies as part of an MTD programme on "Treatment of Water Offshore-III". This paper deals with the comparative mass transfer performance of a laboratory device similar to both the Grisham, et al Patents" and ASH units and a small packed column. The results given were for HTU or 'Height of Transfer Unit' correlation whilst stripping toluene or oxygen from seawater and from fresh water. The conclusion states a 250-fold improvement in process performance of the compact device over a packed column.

In general, the prior art has taught a definite shift in thinking by the researchers and developers working in this field. The shift is recognition that liquid surface area can be increased by orders of magnitude over gravity dependent methods by containing liquid in an acceleration field and introducing gas into the acceleration field. The introduction of gas through porous media and further into the liquid provides a convenient way to control the gas bubble size by choosing beneficial porous media shape, porosity and permeability properties. It is desirable to obtain the smallest practical gas bubble size distribution flowing through a thin liquid film to achieve the largest liquid surface area per unit volume. A flat porous plate with a fast moving liquid film and introduction of gas from the underside of the plate would be a nice model to analyze mathematically, however, a cylindrical porous containment is more practical to build and offers better control over liquid film thickness and fluid dynamics in general. The result of a radial acceleration field is that it is, for all practical purposes, independent of its orientation with respect to earth's gravitational field.

The Grisham et al. patents teach a device that is generally horizontally disposed relative to earth's gravitational field. The Grisham et al. patents also teach a device that comprises at least one cylindrical porous tube that is coaxially aligned with a non-porous outer jacket, more particularly, a long porous element divided into segregated pressure chambers along the length of the porous tube. The porous element may be divided into two or more segments and mated together end to end to form a longer tube. The acceleration stated to operate the device is up to 1500 times the earth's gravitational acceleration or 32.2 ft/s$^2$ (g) or about 48,000 ft/s$^2$ or as little as 400 g or roughly 13,000 ft/s$^2$. The stated volumetric gas rate to volumetric liquid rate is up to 50 to 1 or as little as 10 to 1. It is unclear whether this volumetric gas flow rate is based on standard temperature and pressure conditions or actual temperature and pressure conditions. Since gas is compressible, the rates expressed in volumetric units can vary widely depending on the temperature and pressure at actual conditions. The stated number of liquid revolutions is up to 50 revolutions from the point of liquid introduction to the point of liquid exit from the device.

A great deal of effort and debate surrounds the length of porous media required in this invention and consequently, the residence time required to achieve the desired results in a particular process. Grisham et al, U.S. Pat. No. 5,529,701, column 13, paragraph 25, suggests that each incremental volume of liquid needs to reside for 0.5 seconds in the gas sparged acceleration field to achieve equilibrium. With this time parameter enforced in the design of the invention, it becomes more clear why the tube is so long, why the hydraulic energy and liquid acceleration is so large to move liquid to the end of a long tube, wily the volumetric gas rate is so high to balance the liquid energy without wetting the porous media over relatively large tube external surface area, and finally, why different gas pressure chambers are required to get good gas flow distribution along the entire length of a long porous tube. In practice, in those applications where diffusion distance limits equilibrium, the time of contact is mostly irrelevant. In those applications where chemical reaction time drives the process given extremely short diffusion distances, the residence time has to be considered and consequently, the apparatus and method of operation must allow adequate residence time to complete the specific reaction desired. Observation of test results with the Grisham et al. invention yields surprising results about the required residence time for a process to occur. It is suggested here that the literature dealing with this subject assumes a quiescent system where diffusion distance increases the time required to achieve equilibrium. In this system, the real residence time required has yet to be discovered application by application and in every case appears to be less time than the best prediction made by those observers skilled in the art of operating the same process with conventional installed equipment. The porous tube implicated in the Grisham et al. invention is made excessively long by imposing a residence time parameter on the invention design and applied to processes limited by diffusion distance and not by time. If this parameter is relaxed based on empirical observation, the other operating parameters and the overall invention design can be reworked, changed, and extended accordingly.

In practice, the Grisham et al apparatus has been manufactured using standard 'off-the-shelf' piping or tubing components such as tees and flanges. The device size is referenced by non-limiting example to flow between 15 and 250 gallons per minute of liquid. The device is scalable and it is stated in U.S. Pat. No. 6,004,386 at the top of column 16, "there may be a practical limit of scale versus utilization of multiple units of apparatus to accommodate large flow rates." Since the basis of all Grisham et al. patents is for a "coaxially aligned cylindrical porous tube . . . and further including at least one nonporous outer jacket disposed concentric with said at least one porous tube . . . " mated end to end, the scale-up to large process volumes would necessitate a very large diameter porous tube. Although this may or may not be physically possible to accomplish in practice, consider the following example applied to the Grisham et al. design and utilizing the design parameters disclosed in the patents:

Assume process flow rate of 3000 gallons per minute.

Assume centrifugal acceleration=1000 g adequate to maintain liquid film stability 1000 g=32,200 ft/s$^2$=v$^2$/r where v is velocity and r is porous tube radius.

A 20" diameter porous tube is indicated based on area ratios of ⅓ liquid, ⅔ gas.

Solving for velocity gives v=163.8 ft/s.

The liquid injection nozzle cross-sectional area indicated is about 5.87 sq. inches.

This example indicates a liquid flow nozzle having liquid velocity of about 164 ft/s, and a Reynolds Number for 60° F. water=2.6×10$^6$.

The above example illustrates basic hydraulic principles, and references may be found in the literature for the treatment of incompressible viscous flow through pipes. Standard engineering practice normally places a practical limit of flow velocity for liquids through pipes of 15 ft/s and generally not to exceed 20 ft/s. Incompressible flow through nozzles is generally discussed for flow metering devices in which the flow rate is proportional to the pressure drop measured across a diameter contraction. For meter applications, the calibration range cited in numerous literature sources is limited to a Reynolds Number of about 1×10$^6$. Although the nozzle is not a flow meter, the design basis may be similarly considered for practical application. If the design basis of the nozzle is limited, and the limitation imposed is by the Reynolds Number, then the limit for centrifugal acceleration in the above example would become as follows:

Reynolds Number=1×10$^6$

Velocity=62.7 ft/s

Centrifugal acceleration=393 ft/s$^2$=12.2 g

Based on the recited parameters, 12.2 g would not be sufficient to operate the device.

This example illustrates only one problem of scalability of the Grisham et al. apparatus. There are numerous others. The practical application of incompressible flow through the invention nozzle must also take into account the presence of particulate material contained in the process liquid with some applications. Moving liquid at 164 ft/s where solids are present in the liquid flowing through the invention nozzle would quickly erode the nozzle. The alternative method available to scale the Grisham et al. invention for large capacity is to utilize multiple apparatus assemblies of smaller capacity in place of one large capacity assembly. Since the invention is for a "coaxially aligned cylindrical porous tube . . . and further including at least one nonporous outer jacket disposed concentric with said at least one porous tube . . . ", the use of multiple assemblies of the invention would take the form of multiple tubes with concentric tube outer jackets. For clarification, the form of the prior art applied to large flows requires using multiple assemblies of individual pressure containing units arranged in parallel to split a large process flow into numerous smaller flows for distribution to each smaller invention assembly. This arrangement may or may not be practical. The application of multiple pressure containing invention assemblies may be driven by economics and not by engineering design. The economics quickly reduce to an accounting of the number of pipes, fittings, valves, meters, controls, and in general, all of the ancillary equipment required to operate the invention arranged in individual pressure containing assemblies for large capacity operation in an industrial setting.

The present invention is distinguished over the prior art in general, and these patents in particular by an apparatus and method for contacting large volumes of gas and liquid together on a microscopic scale for mass transfer or other transport processes where the contact between liquid and gas occurs at the interfaces of a multitude of gas bubbles. The apparatus includes a plurality of cylindrical or conical porous tube elements inside a pressure/vacuum vessel assembled in a bundle similar to a heat exchanger and terminating at each end in a tube sheet; a tangential nozzle for introducing thin film liquid flow into the inside diameter of each porous element in a helical flow pattern around and along the inside walls of the porous media; seals on each end of the porous media to segregate the gas flow from the liquid flow without first passing through the porous media and through the thin liquid film; an annular flow separator target nozzle at the second end of the porous section to divert liquid flow to a vessel and redirect the gas flow in a direction countercurrent to the liquid flow. The present method of contacting large volumes of gas and liquid for mass transfer or other transport processes in general comprises introducing a liquid flow tangentially into the inside diameter of each cylindrical or conical porous tube, assembled in a bundle and terminating at each end in a tube sheet, where the liquid flows in a thin film in a helical pattern around and along the inside walls of the porous media, controlling the hydrodynamics of the flow; sparging gas into the porous media and the thin liquid film at a proportional flow rate to the liquid flow rate so that an annular two phase flow with a uniform distribution of tiny gas bubbles results; maintaining a pressure balance and a distinct boundary layer near the inside diameter of each tube where the porous media does not become wetted by the flowing liquid; maintaining the annular thin film flow through the device so that enough energy remains to separate fluids due to differences in density at the exit of the device.

SUMMARY OF THE INVENTION

The present invention provides a method of creating and maintaining beneficial physical conditions for the transport of momentum, heat, and mass between a liquid and a gas across a multitude of microscopically small gas bubble interfaces so as to optimize the efficiency of interphase transport, and also provides economical modular apparatus for effective industrial scale utilization of the method. With the method and apparatus of the invention, interphase transfer equilibrium is achieved rapidly and within very compact theoretical unit volumes and physical apparatus volume due to greatly reduced spatial separation between components allowing diffusion to occur almost instantaneously.

The apparatus of the present invention generally includes a bundle of cylindrical or conical microscopically porous tubes, diametrically and circumferentially evenly spaced inside a pressure/vacuum vessel, oriented where the centerlines of each tube are parallel to the centerline of the vessel cylinder, terminating in perpendicular tube sheets similar to a shell and tube heat exchanger, sealed and seated at both ends in tube sheet tube seats, open to flow at both ends in the inside diameter of each tube, with porous walls and hollow interiors comprising each tube, liquid inlet nozzle assemblies disposed at the first ends of each tube, gas-liquid separator target nozzle assemblies disposed at the opposite second ends of each tube, a liquid collection pressure vessel, and a gas discharge assembly near the first ends of the tubes. The tubes are enclosed inside an outer vessel cylinder such that it forms one or more chambers capable of being pressurized with gas. The gas chamber may be commonly pressurized or it may be divided into multiple chambers or sections so that one or more tubes or groups of tubes may be pressure isolated from the other tubes in the bundle and distribution of gas to each tube or group of tubes may be controlled individually. The liquid collection pressure vessel may be oriented either vertically or horizontally depending on process requirements, preference and/or on the space available for a particular application.

Liquid is introduced tangentially into the inside diameter of each tube through liquid inlet nozzle assemblies with sufficient pressure and flow rate to create a high velocity flow of the liquid in a thin film around and along the inner surface of the porous wall of each tube. When the liquid meets the interior of a tube, the inlet velocity vector may or may not be divided into a radial velocity component vector and a longitudinal velocity component vector. The longitudinal velocity vector component may at first introduction of liquid be equal to zero. The addition of a longitudinal velocity vector component, if desired, may be accomplished by controlling the lead angle at which the liquid inlet nozzle is disposed tangentially relative to the inside diameter of the tube. Where the direction of longitudinal flow in the device is approximately in the same direction as earth's gravitational acceleration vector, the lead angle is not particularly required to achieve the desired flow pattern. The high velocity flow of liquid in a helical pattern around and along the inside walls of the tube produces a centrifugal or outward force of sufficient magnitude, acting to force the liquid against the inner surface of the tube with a velocity vector direction generally normal or perpendicular to the longitudinal axis of the tube. The liquid radial velocity, and thus the outward acceleration, is sufficient to maintain the liquid film against the inner wall surface of the tube throughout its entire length.

In a first embodiment, pressurized liquid is introduced to all liquid inlet nozzle assemblies connected by a common pressure chamber at the same flow rate and pressure simultaneously. In a second embodiment, each inlet nozzle assembly has a separate liquid inlet and pressurized liquid is introduced to each porous tube individually. The liquid flow rate and pressure individually feeding each tube or group of tubes may be controlled such that one or more tubes or group of tubes may be turned off while other tubes or tube groups are still in operation. Liquid flow control in this configuration allows for sequential ranges or step-wise turn-up/turn-down so that overall a broader range of process turn-down ratio may be achieved. This arrangement also allows the use of tubes of differing diameters and capacities to cover the overall liquid capacity range and turndown ratio required by the process.

Pressurized gas is introduced into the pressure vessel chamber or chambers and forced through the porous walls of the tubes by virtue of the differential pressure between the pressurized gas chamber and the inside diameter zone of each porous tube. The tubes are seated and sealed in tube sheets such that the gas can only flow through the porous walls of the tubes. Where liquid flow control exists for each tube or group of tubes individually in the bundle, the gas supply to the same each tube or group of tubes may be individually controlled so that gas is not flowing to a tube or tube group that is out of service. The gas exits the porous wall at its inside diameter surface and is immediately contacted by the liquid, which is moving at high velocity relative to the tube wall and to the gas as it enters the interior of the tube. The gas is sheared from the porous wall by a liquid boundary layer moving approximately perpendicular relative to the gas. The result of this introduction of gas through the labyrinth of pores in the porous tubes into a liquid having a centrifugal or outward acceleration in the approximate opposite direction to the gas velocity vector direction is that a multitude of very fine bubbles are produced, and are carried away from the tube wall by the moving liquid in its radial flow pattern around the inside diameter surface of each porous wall, and longitudinally toward the liquid exit from each tube. The mixture of liquid and gas bubbles forms a two-phase flow that exists in a helical flow pattern around and along the inner surface of each tube. The buoyancy of the bubbles relative to the liquid causes them to move toward the region of lowest pressure or the center zone of the tube and against the centrifugal (outward) acceleration of the liquid phase, passing through the froth created by the two phase flow as it moves around the inner surface of each tube. The gas exits from the two-phase flow at the inner flow boundary created at the inside diameter of the thin film and is transported axially from the tube. Because the specific gravity of the liquid is much higher than the specific gravity of the gas, the centrifugal acceleration imposes a substantially higher force on the liquid than on the gas. The gas is thus able to move to the center of the tube while the liquid is forced toward the wall of the tube. The result of this density difference produces a distinct gas phase in and along the axial core of each porous tube, minimizing liquid entrainment with the gas in the central portion of the tube, and inducing a clean separation between the gas column at the center of the tube and the two phase flow along the inside diameter surface of the tube.

As the bubbles pass through the liquid, momentum, heat and mass are transferred on a molecular level between the liquid and the gas in accordance with the laws of thermodynamic equilibrium. Mass transfer occurs between the two components as determined by the value of the appropriate partition coefficient and the initial concentration of the transferring component in each phase. In general, the concentrations of the transferring component in each bubble of gas and in the immediately surrounding liquid are at or closely approaching equilibrium when the gas in each bubble exits from the liquid to the gas column at the center of the tube. Each volume of gas passes through the liquid only once within the apparatus, and each passage is associated with an approach to equilibrium.

The modular configuration of the present invention allows parameters to be adjusted for the most efficient operability range including broad turn-up/turn-down ratios that invariably have to be considered and incorporated. The modularity of the present invention also allows reduction of studies in process design, mechanical design, and cost accounting to determine the initial best tube diameter/length ratio versus tube number to roughly size for the operability range of the process. The process performance may be fine-tuned by simply adding or subtracting a tube from service. Tube porosity and tube length, liquid film thickness, gas outlet nozzle diameter, etc. can each be changed out in total or in selected contactors in the bundle.

Consolidating the gas-liquid contactor and associated hardware needed to house the porous tubes, collect liquid, scrub gas, etc. into a pressure/vacuum vessel allows further use of conventional vessel internal devices like baffles, mist eliminators, vanes, vortex breakers, etc. to improve the overall performance of the present invention. For example: gas baffles in the gas supply section of the vessel to prevent the incoming gas stream from impinging directly on the outside surface of a porous element and potentially creating uneven gas distribution to the entire available external surface area of the cylindrical or conical element; liquid motion baffles to mitigate sloshing for those process applications where the vessel is mounted on and operates on a moving deck, mesh pads and/or vane packs used in the gas scrubber section of the vessel to minimize any entrained liquid carryover prior to the final gas exit from the invention. Vessel external hardware commonly required to fabricate, install, start, and safely operate the process, and/or required by code may also be incorporated and would appear as vessel nozzles for level gauges/transmitters, extra vessel nozzles in general needed for gauges, meters, switches, vents/drains, pressure safety valves, etc.; along with required manways, davits, lifting lugs, code stamps, nameplates, etc.

The apparatus and method of the present invention, as well as the features and advantages associated therewith, will be described in more detail with reference to the accompanying drawing figures.

BRIEF DESCRIPTION OF THE DRAWINGS

FIGS. 16A and 16B are schematic diagrams showing arrangements wherein a pair of the gas-liquid contactor assemblies are operated in series and in parallel, respectively.

DESCRIPTION OF THE PREFERRED EMBODIMENTS

Figures 1, 3:
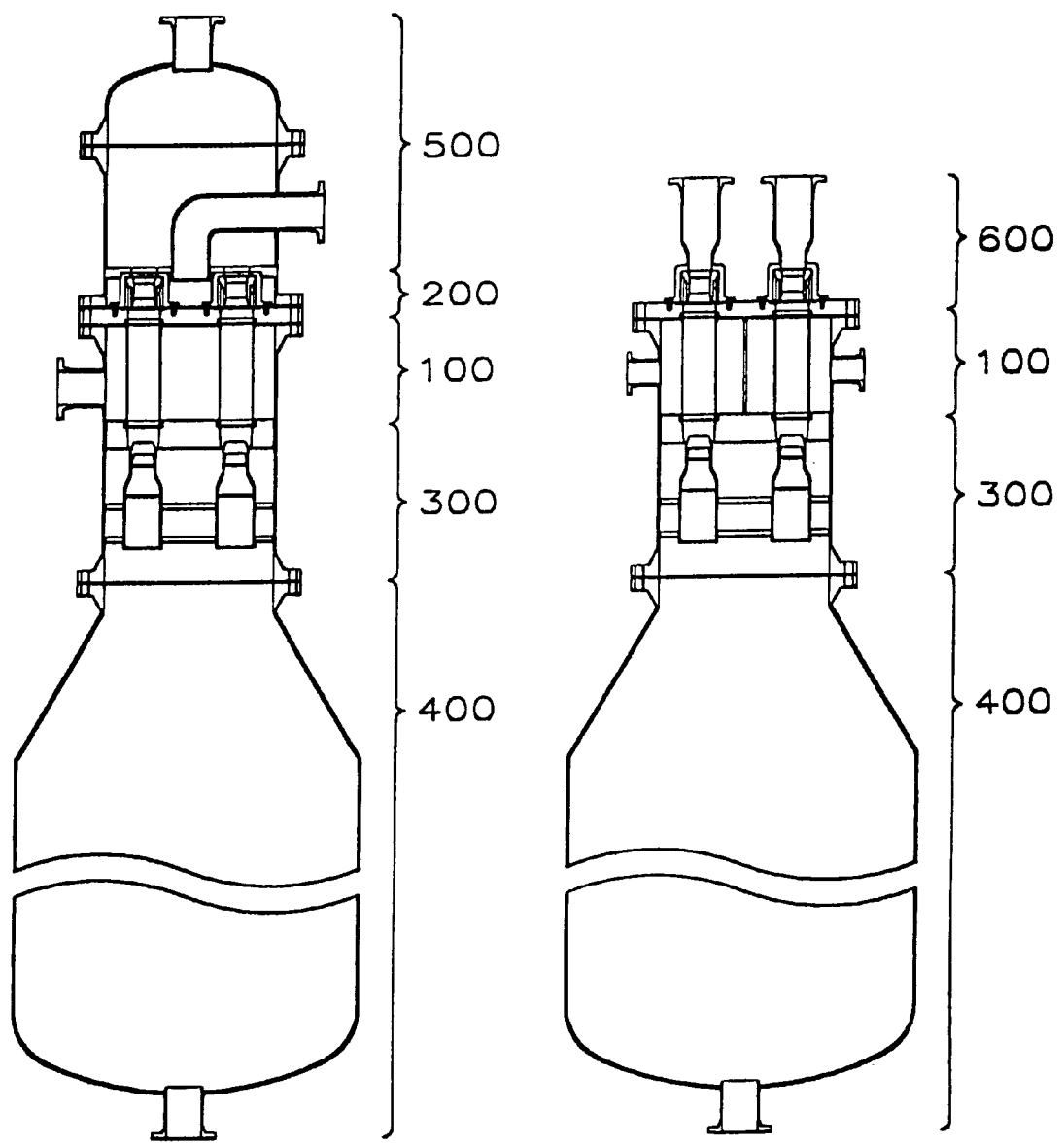
FIG. 1 is a schematic longitudinal cross-section of a first embodiment of the apparatus of the present invention, showing the major assemblies and functional zones of operation.
FIG. 3 is a schematic longitudinal cross-section of a second embodiment of the apparatus, showing the major assemblies and functional zones of operation.
Figure 4:
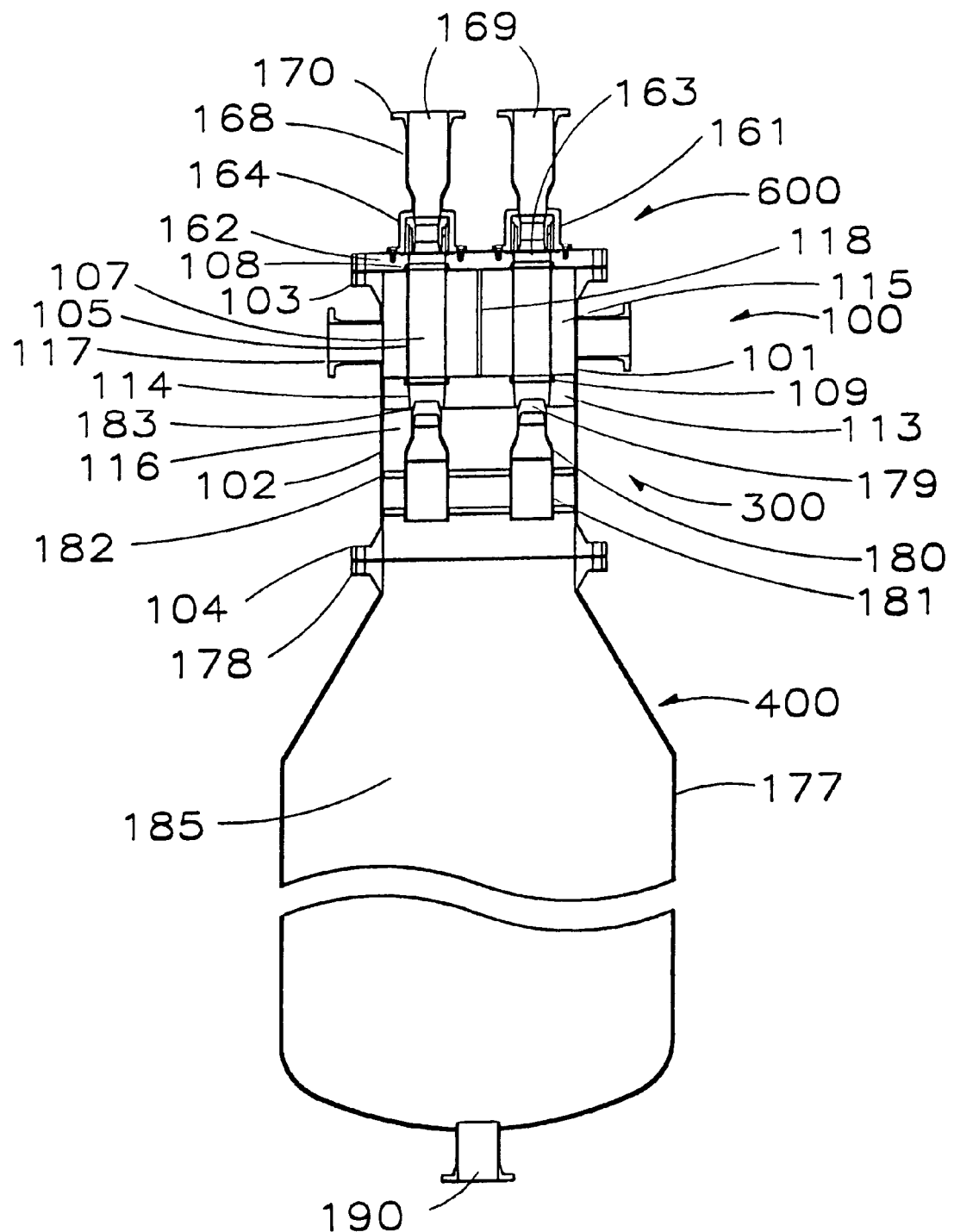
FIG. 4 is a schematic longitudinal cross-section view of the second embodiment with reference numerals identifying the parts and regions of the invention.
Figure 5:
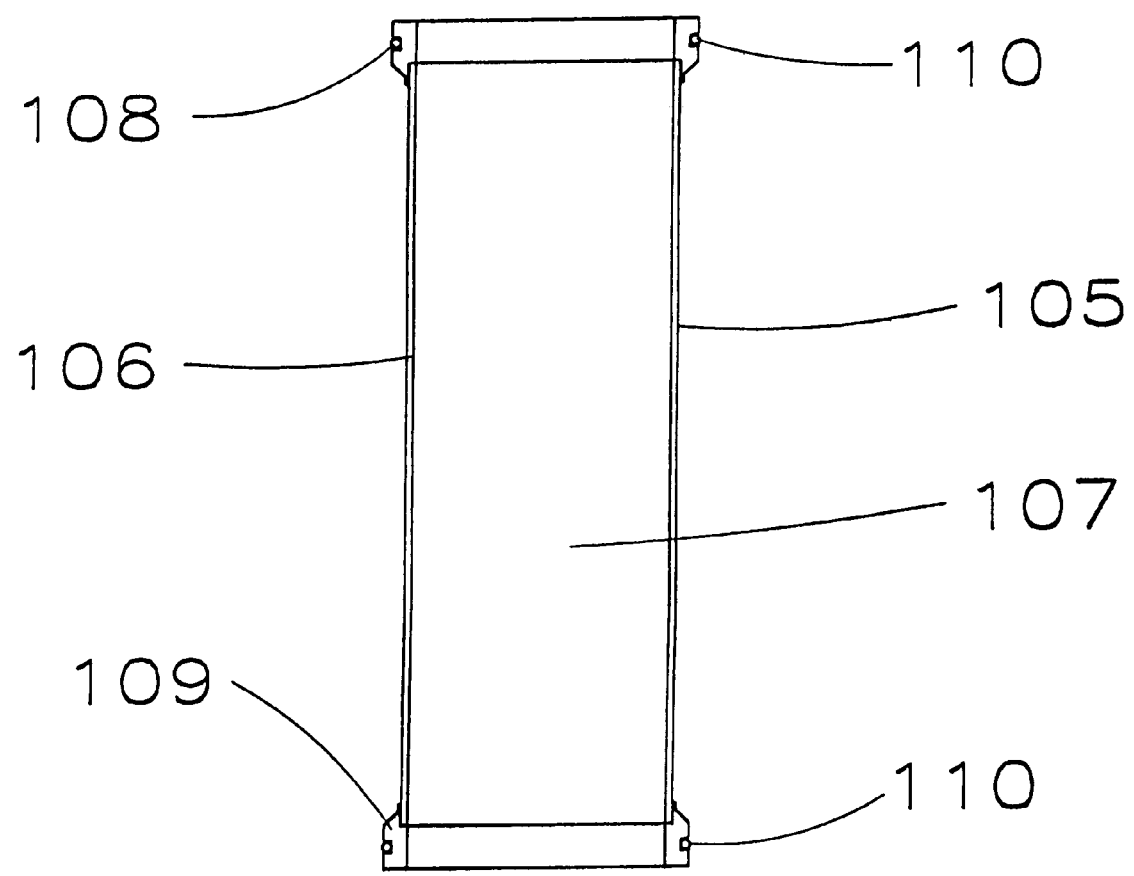
FIG. 5 is an enlarged longitudinal cross-section view showing the details of a preferred embodiment of a porous tube cartridge.
Figure 6:
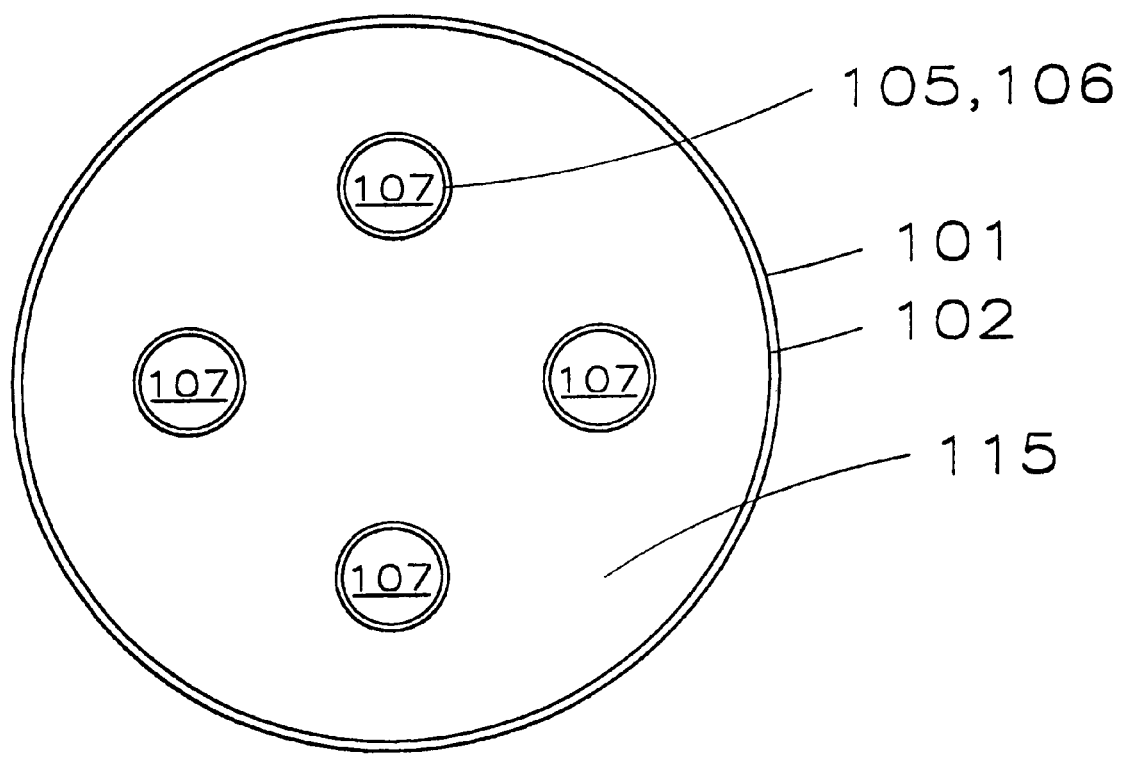
FIG. 6 is a transverse cross-section view through the gas-liquid contactor section, showing the multiple porous tubes arranged in a bundle.

In the following discussion, the apparatus for contacting large volumes of gas and liquid across a multitude of microscopic interfaces of the invention will be described in detail, followed by a description of the method of operation. Referring to the drawing figures, a first embodiment of the invention is shown, somewhat schematically, in cross section in FIGS. 1 and 2, and a second embodiment is shown in FIGS. 3 and 4, which differs from the first embodiment in the uppermost section. Both embodiments have a gas-liquid contactor section 100, a liquid exit section 300 below the gas-liquid contactor section, and a liquid collector section 400 below the liquid exit section. The first embodiment of FIGS. 1 and 2 has a liquid feed and gas exhaust section 200 above the liquid contactor section and a gas dome 500 above the liquid feed section, whereas the second embodiment of FIGS. 3 and 4 has a different type of liquid feed and gas exhaust section 600 and no gas dome. The features of sections 100, 300 and 400 are essentially the same in each embodiment of the invention.

Figure 8:
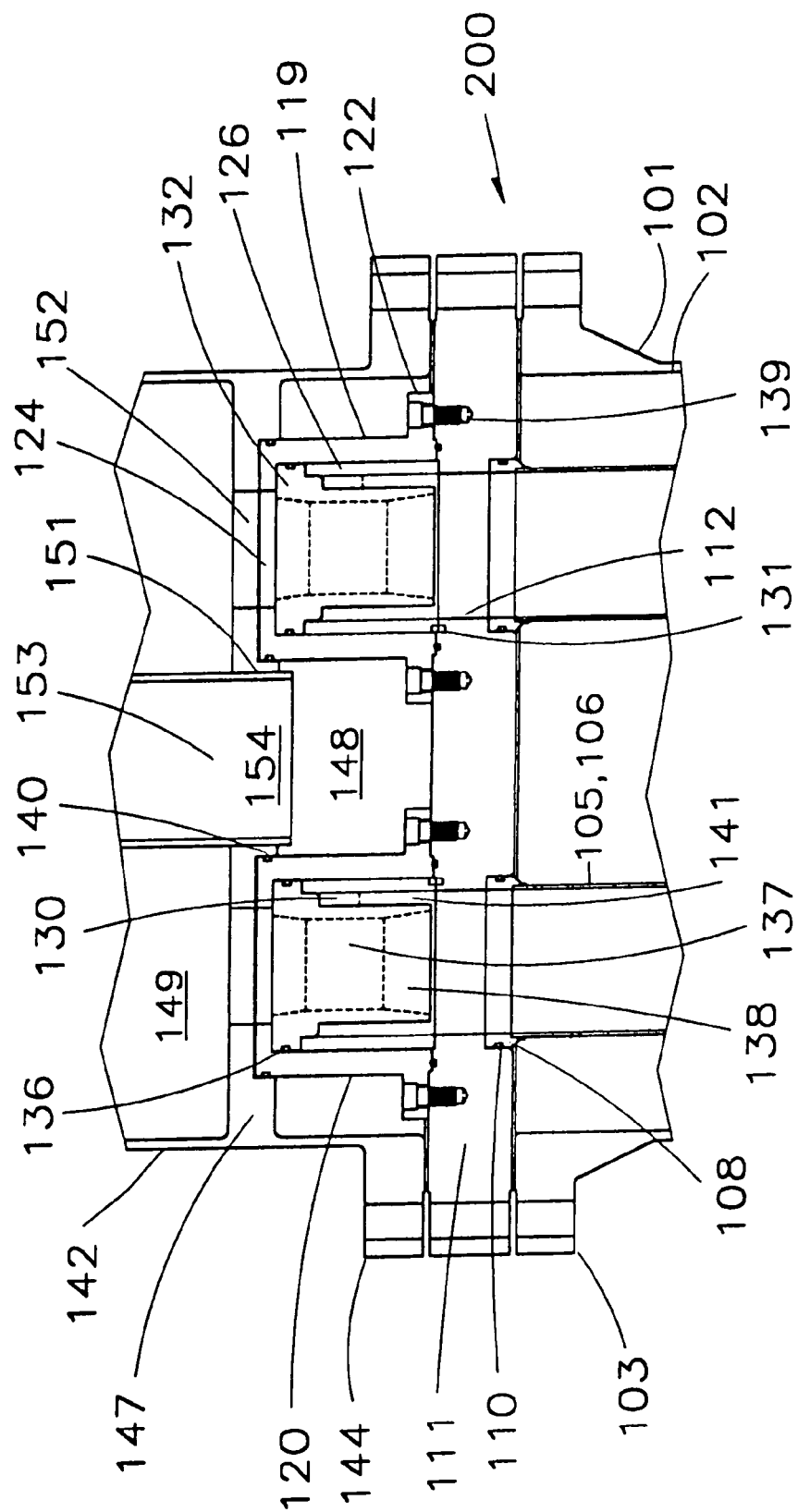
FIG. 8 is an enlarged longitudinal cross-section view of the liquid feed and gas exhaust section and the liquid inlet nozzle assemblies of the first embodiment of the invention.
Figure 9:
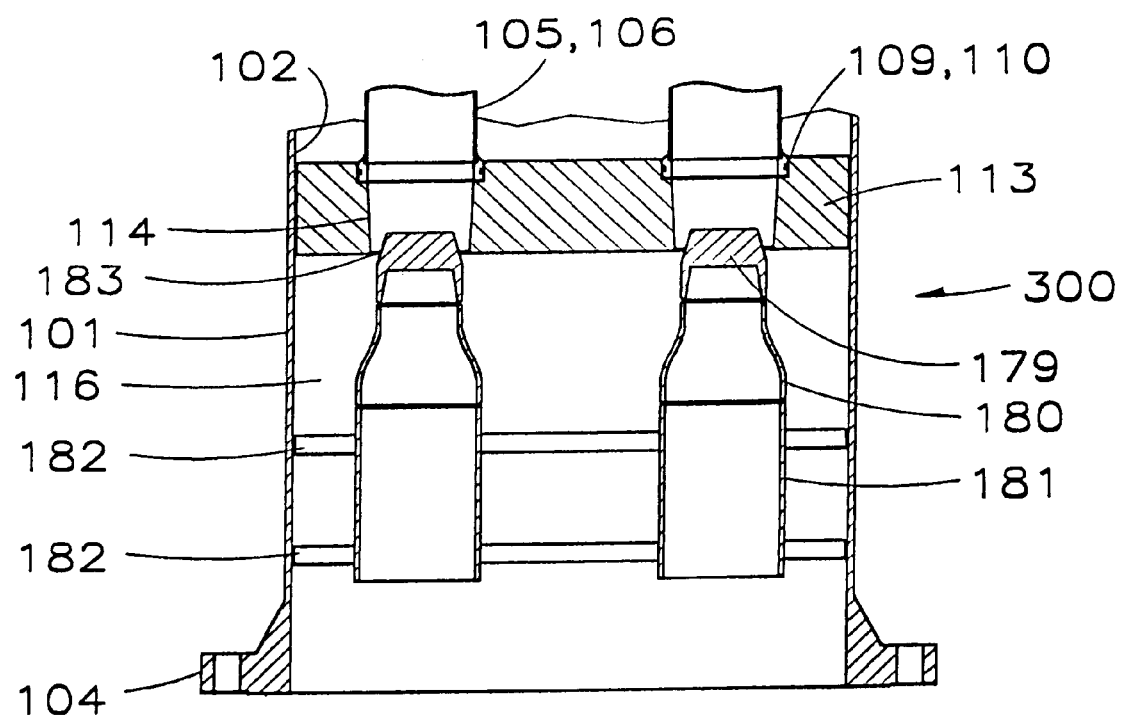
FIG. 9 is an enlarged longitudinal cross-section view of a first embodiment of the liquid exit section and liquid separator nozzle assembly that may be used in the first or second embodiments of the apparatus.

The gas-liquid contactor section 100 comprises an outer vessel 101 having a central longitudinal axis circumscribed by a non-porous generally cylindrical side wall 102 with an upper flange 103 and a lower flange 104. Referring additionally to FIGS. 5, 6, 7, 8 and 9, a plurality of elongate tubes 105 are disposed within the outer vessel 101 in circumferential and radially spaced relation with their longitudinal axes parallel to the outer vessel longitudinal axis. Each of the tubes 105 has a microscopically porous side wall 106 with an inner surface surrounding a hollow interior 107 and opposed first (upper) and second (lower) ends 108 and 109, which are non-porous and provided with seal means 110, such as an O-ring seal. The tube ends 108 and 109 may be welded, glued, cast, molded, fused, or otherwise formed or attached to the porous tube 105 so that the tube can be sealed at both ends, and be easily replaceable. The cross-section of the porous tubes 105 may be cylindrical or conical. As best seen in FIGS. 8 and 9, the exterior of each of the first (upper) ends 108 of the tubes 105 is sealingly engaged in a respective bore 112 in a first disk-shaped tube sheet 111 bolted to the upper flange 103 of the outer vessel 101 and the exterior of their second ends 109 are sealingly engaged in a respective bore 114 in a second disk-shaped tube sheet 113 in the outer vessel having an outer periphery engaged in sealing relation with the interior surface of the outer vessel side wall 102, similar to a shell and tube heat exchanger. Thus, the tube sheets 111 and 113 form a pressurized gas chamber 115 surrounding the tubes 105 in upper portion of the outer vessel (FIGS. 2 and 4) and the second tube sheet 113 forms a gas-liquid separator chamber 116 isolated therefrom in the lower portion of the outer vessel, and the interior of the tubes are open to liquid flow through the tube sheets. The outer vessel 101 has at least one gas inlet 117 with an interior in fluid communication with the gas chamber 115 for pressurizing it with gas.

Figure 2:
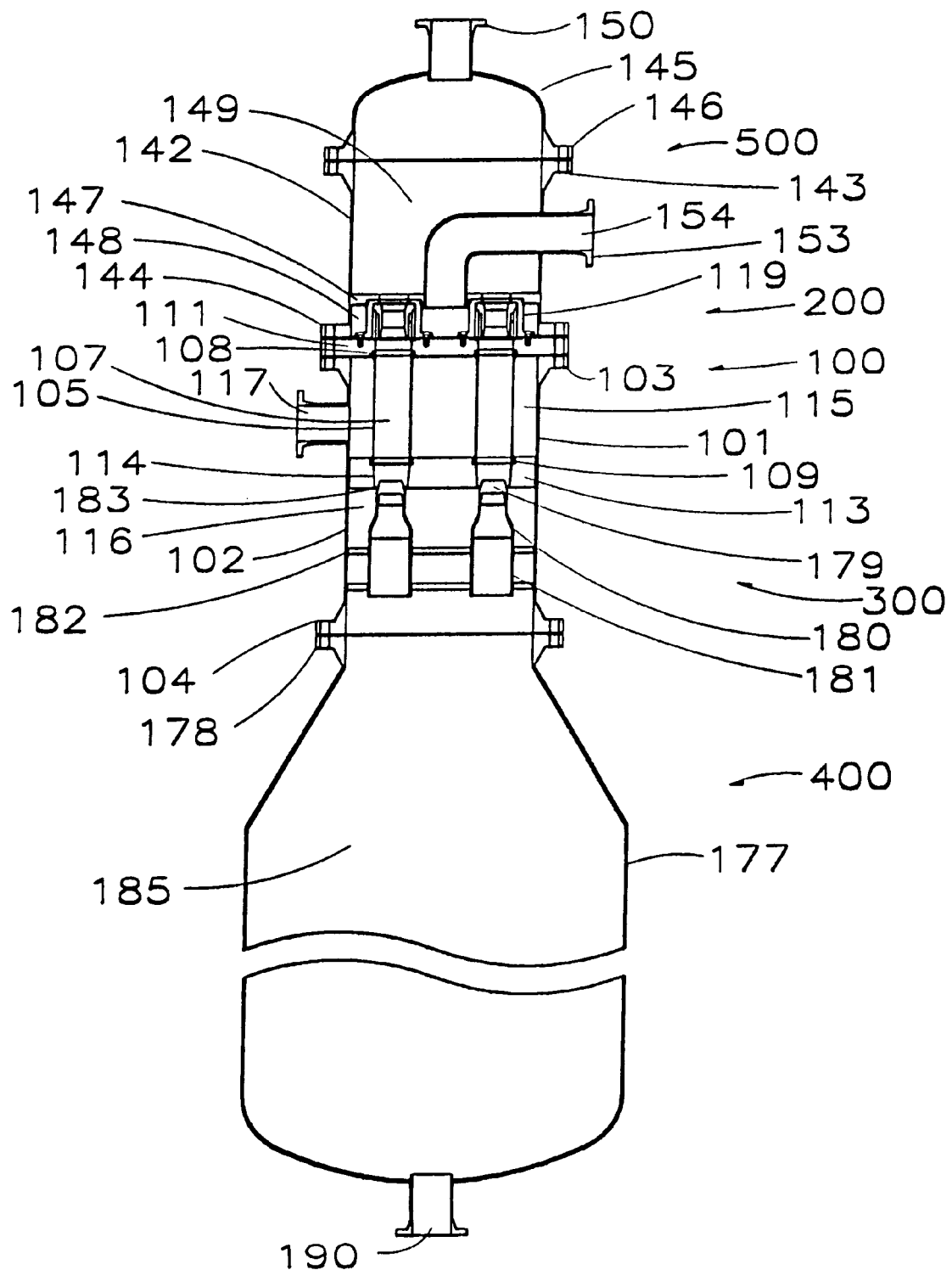
FIG. 2 is a schematic longitudinal cross-section of the first embodiment of the first embodiment with reference numerals identifying the parts and regions of the invention.

In the first embodiment of FIG. 2, there is a single gas chamber 115 and in the second embodiment of FIG. 4, the gas chamber 115 is partitioned by plates 118 into multiple segregated pressurized gas chambers each having a respective gas inlet 117, so that one or more tubes 105 or groups of tubes may be pressure isolated from the other tubes in the bundle and distribution of gas to each tube or group of tubes may be controlled individually.

The porous tubes 105 may be in the form of cartridges and may be made of any compatible material having suitable properties of geometry, porosity and permeability, corrosion resistance, thermal stability, etc. The porosity range of interest used is generally about 0.5 micron up to 40 microns.

The materials of construction of porous tubular elements is widely available in plastics such as Kynar™, Teflon™, polypropylene, etc.; in many metal alloys such as 316 stainless steel, nickel-aluminum-bronze, nickel alloys—Hastelloy™, Monel™, etc., tantalum, etc.; and in ceramic materials—aluminas, cordierites, silicon carbide, aluminum nitrides, zirconias and/or composite ceramic structures. The media may also be composites of laminated materials designed to produce the desired combination of properties. Porous media produced by other methods of manufacture, such as woven wire mesh, may also be used. In general, any porous media, regardless of material or manufacturing approach, may be used, so long as the media is capable of suitable performance under the conditions to which it will be exposed. In some applications, surface active catalytic materials may be embedded or otherwise be present in the porous media. The surface finish on the inside diameter of the tubular elements may be further treated to enhance liquid flow properties. An example surface treatment used with some metal alloy porous tubes is electropolishing. In some cases, the tubes may be reconditioned and reused by cleaning methods like ultrasonic bath, solvent wash, heating or combination thereof to restore the tube permeability to the near new condition. ASTM (American Society for Testing Materials) and ISO (International Organization for Standardization) both have published standards for permeability measurement technique generally involving a bubble point test. Bubble point testing may be used to generate a baseline performance for the porous tube cartridges and further used to recertify a reconditioned tube.

One of the main features of using porous tubes 105 to produce a multitude of tiny bubbles in a liquid stream is the ability to supply clean gas to the apparatus. The porous media is not intended to provide gas filtration. It should be understood that polishing filters, where required, may be used upstream of and/or around each porous element 105 inside the gas supply chamber 115 to provide the final polishing filtration for the gas. In some cases, additional gas pretreatment may be required to remove particulate matter and/or remove condensable liquids prior to introduction into the apparatus.

Figures 11A, 11B:
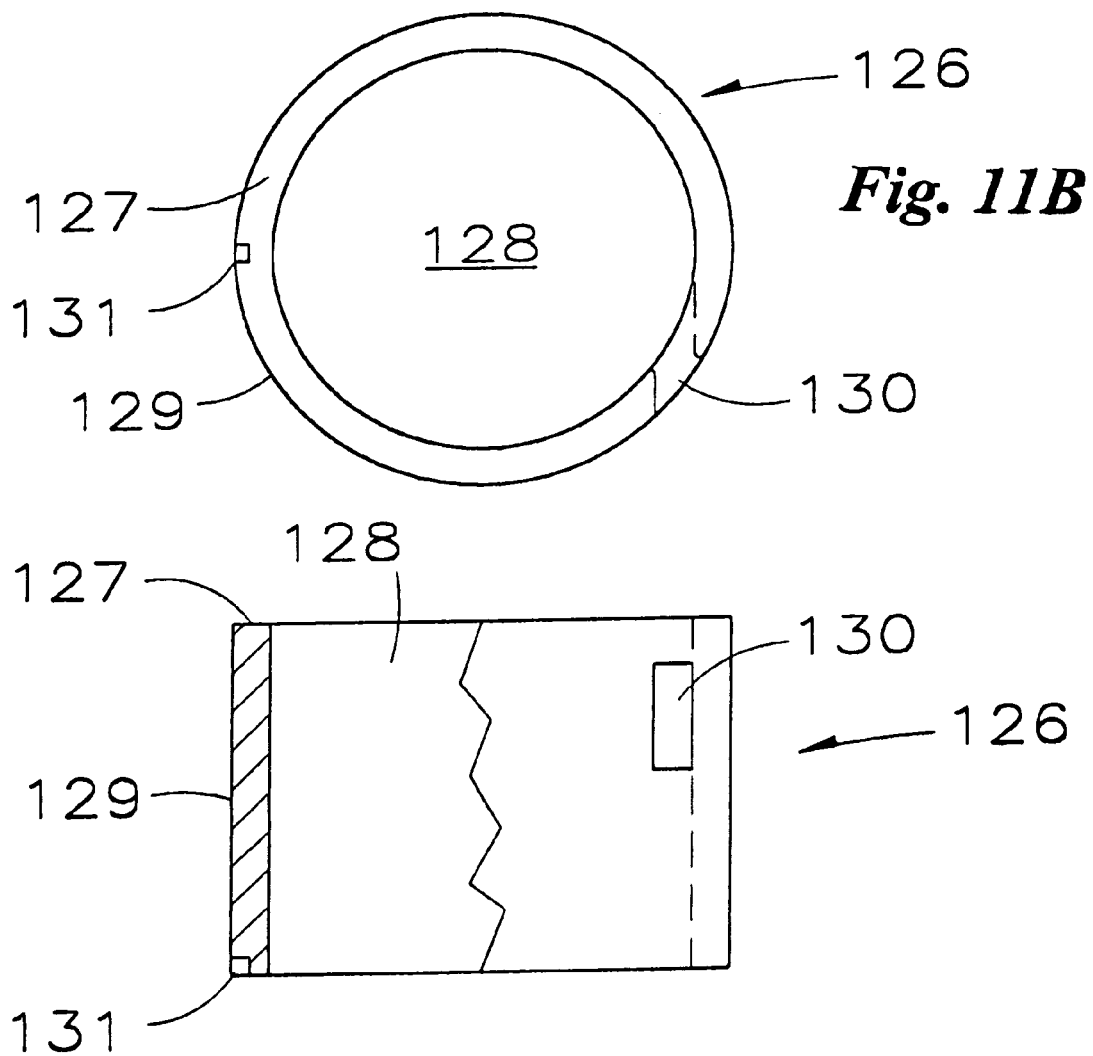
FIGS. 11A and 11B are a partial longitudinal cross-section view and a top plan view, respectively, of the liner member of the liquid inlet nozzle assembly.
Figure 12B:
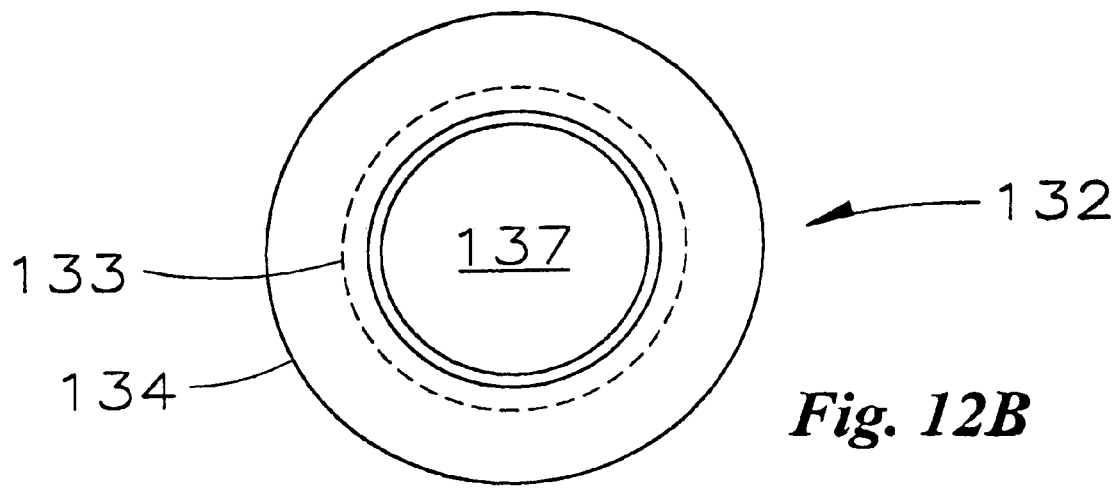
FIGS. 12A and 12B are a longitudinal cross-section view and a top plan view, respectively, of the vortex finder member of the liquid inlet nozzle assembly.
Figure 12A:
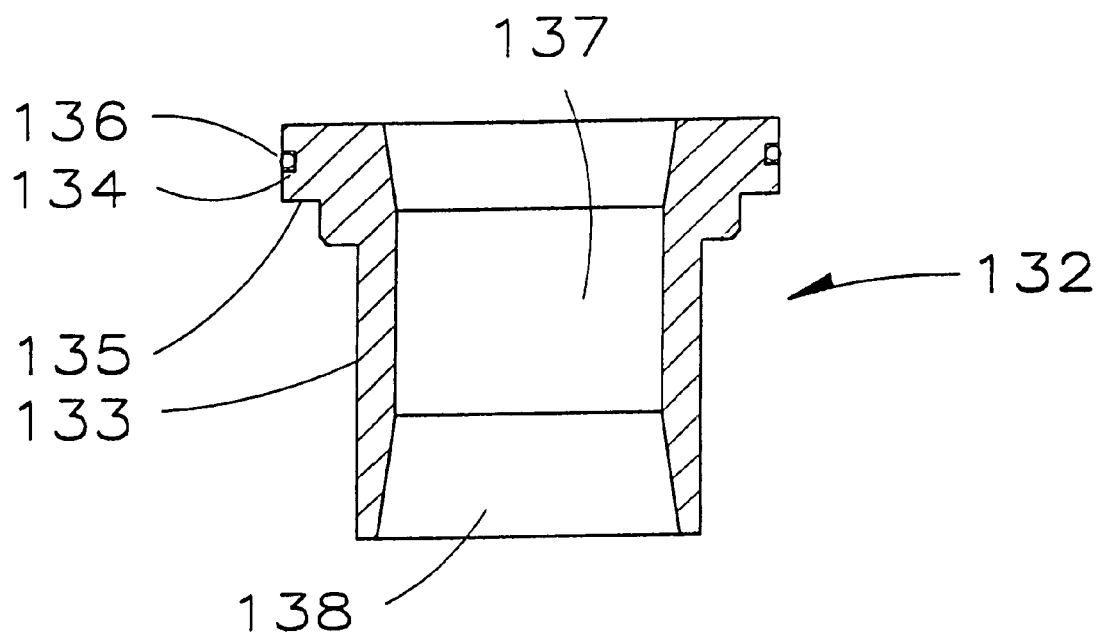

Referring now to FIGS. 8, 10A, 10B, 11A, 11B, 12A and 12B, the liquid feed and gas exhaust section 200 of the first embodiment is shown in greater detail. A liquid inlet and gas exhaust nozzle assembly 119 is secured over each of the bores 112 in the first tube sheet 111 in axial alignment with the bores and the first or upper end 108 of each tube 105. The liquid inlet and gas exhaust nozzle assembly 119 includes a nozzle housing 120 (FIGS. 10A, 10B) having a generally cylindrical side wall 121 with a radial flange 122 at its bottom end, a larger interior diameter 123 extending upwardly therefrom, a reduced diameter exhaust opening 124 at its top end, and a rectangular liquid inlet nozzle aperture 125 through its side wall tangential to its interior diameter to establish tangential liquid flow of a thin film of incoming liquid. The rectangular nozzle aperture 125 is precisely formed by removing material on the side wall 121 of the nozzle housing to establish liquid communication with a nozzle liner 126 (FIGS. 11A, 11B). The nozzle liner 126 is a hollow cylindrical member having a side wall 127 surrounding an interior diameter 128 and an outer diameter 129 that fits precisely inside the interior diameter 123 of the nozzle housing 120 so that the tolerance or fit-up of the liner outer diameter is as close as possible without interference between the two parts. The nozzle liner 126 has a rectangular liquid inlet aperture 130 formed in its side wall to introduce liquid flow in a thin film 156 (shown schematically in FIG. 7) disposed tangentially to its inside diameter 128 and dimensioned to line up with the liquid inlet aperture 125 of the nozzle housing 120. The liquid inlet aperture 130 has a cross sectional area to produce a thin film of liquid having a thickness in the range of from about 5% to about 28% of the inside diameter of the tube. The liner 126 is pinned at 131 to the tube sheet 111 or otherwise prevented from rotating out of alignment when pressurized liquid is forced at a high velocity through the aperture 130. The inside diameter 128 of the liner 126 and the inside diameter 107 of the porous tube 105 are approximately the same diameter so that the thin film liquid flow is not disturbed as in passes along the transition between the liner 126, the tube sheet bore 112, and on into the porous tube. The nozzle liner 126 may be made of ceramic materials and be easily replaced periodically in those applications having very high fluid velocities and/or erosive solids in the liquid.

A vortex finder 132 (FIGS. 12A, 12B) is disposed within the nozzle housing 120. The vortex finder 132 is a generally cylindrical member having a reduced diameter lower portion 133 and a larger diameter upper portion 134 defining a radial shoulder 135 therebetween that rests on the top end of the liner 126. The upper portion 134 is provided with seal means 136, such as an O-ring in an O-ring groove, which engages the interior diameter 123 of the nozzle housing 120 in a fluid tight sealing relation and the reduced diameter lower portion 133 is radially spaced from the interior diameter 128 of the liner 126, defining an annulus 141 therebetween (FIG. 8). The vortex finder 132 has a central bore 137 coaxial with the exhaust opening 124 in the nozzle housing 120 and an interior conical diverging lower portion 138 to provide a flow path for exhausting return gas into the gas dome 500 (described hereinafter). The central bore 137 of the vortex finder 132 is the converging-diverging gas exit nozzle throat passage that allows processed gas to exit from the gas-liquid contactor section 100 into the gas dome 500. Thus, the vortex finder 132 establishes vortex flow of incoming liquid, and provides a physical separation between the incoming liquid and exhausted return gas.

In applications at, or approaching, sonic gas velocity, the central bore 137 is the limiting diameter to determine how much gas at a particular pressure and temperature can be moved through the nozzle assembly. The central bore 137 and conical diverging lower portion 138 may be enlarged to accommodate higher flows and may be used in conjunction with conical tubes to accomplish the desired diameter and subsequent flow rate at a predetermined pressure drop through the apparatus. The reduced diameter lower portion 133 of the vortex finder 132 is approximately the same diameter as the inner diameter of the liquid film 156 (shown schematically in FIG. 7) before introduction of gas into the liquid that causes the liquid film to thicken slightly.

The liquid inlet nozzle assembly 119 is bolted, or otherwise fastened, onto the tube sheet 111 by bolts 139 passing through bolt holes in the radial flange 122 of the nozzle housing 120 and threadedly engaged in threaded holes in the tube sheet. Seal means 140, such as an O-ring in an O-ring groove is provided on the side wall of the nozzle housing 120 near its top end.

In the first embodiment of FIGS. 1 and 2, a gas dome 500 is mounted above the liquid feed and gas exhaust section 200. The gas dome 500 is a generally dome shaped vessel having cylindrical side wall 142 with an upper and lower radial flange 143 and 144 at its top and bottom end, respectively. As best seen in FIG. 8, the lower radial flange 144 is bolted in sealing relation onto the tube sheet 111 by bolts passing through bolt holes in tube sheet and in the upper flange 103 of the outer vessel 101. A dome-shaped end member 145 has a radial flange 146 that is bolted in sealing relation to the upper radial flange 143. The interior of the gas dome 500 is divided by a divider plate or tube sheet 147 into a separate liquid chamber 148 at its lower end and a gas exhaust chamber 149 above the tube sheet which serves as a gas scrubber section. The dome-shaped end member 145 has a gas outlet 150 with an interior in fluid communication with the gas exhaust chamber 149. As seen in FIG. 8, the divider plate or tube sheet 147 has a central bore 151 and a plurality of circumferentially spaced gas exhaust bores 152 extending therethrough in radially spaced relation thereto. The sells 140 on the side wall of the nozzle housings 120 are sealingly engaged in counterbores on the bottom end of the gas exhaust bores 152 to form a liquid and gas tight pressure containing seal between the liquid chamber 148 and the gas exhaust chamber 149 to prevent incoming liquid from escaping into the gas exhaust chamber. The seal means 136 on the upper portion 134 of the vortex finder 132 prevents incoming high pressure liquid from escaping from the nozzle housing 120 into the gas exhaust chamber 149.

A liquid inlet conduit or pipe 153 having an outer end external to the gas dome 500 extends in sealed relation through the gas exhaust chamber side wall 142 and has a second end sealingly engaged in the central bore 151 of the divider plate or tube sheet 147. The interior 154 of the liquid inlet pipe 153 is in fluid communication the liquid chamber 148, which surrounds the nozzle assemblies 119. The outer end of the inlet pipe 153 may be flanged. Thus, in the first embodiment, liquid is introduced into the liquid chamber 148 through the inlet pipe 153 and fed simultaneously to all of the liquid inlet nozzle apertures 125 in the side wall of the nozzle housings 120, and into the tangential aperture 130 of the liners 126 and is trapped by the vortex finders 132 so that liquid can only flow in one direction in a helical flow pattern around the liners 126, through bores 112 in tube sheet 111, into the tube ends 108, and further into the inside diameter of the porous tubes 105 (shown schematically in FIG. 7). The flow pathway created through the mated parts described above produces a smooth, continuous flow of liquid in a pattern similar in appearance to the rifling marks inside a gun barrel. Angular or radial misalignment of the flow pathway produces undesirable flow disturbances and is amplified with increasing liquid velocity.

In the following discussion of the second embodiment, the components that were shown and described in detail previously with reference to the first embodiment are assigned the same numerals of reference, but they will not be described in detail again here to avoid repetition.

Referring now to FIGS. 3, 4, 13A, 13B and 13C, in the second embodiment, the gas chamber 115 of the outer housing 101 is partitioned by plates 118 into multiple segregated pressurized gas chambers each having a respective gas inlet 117, so that one or more tubes 105 or groups of tubes may be pressure isolated from the other tubes in the bundle and distribution of gas to each tube or group of tubes may be controlled individually. The second embodiment also has a different type of liquid inlet nozzle assembly 161 in the liquid feed and gas exhaust section 600, which is disposed at the first or upper end 108 of each tube 105, and is not enclosed by a dome section. As shown in FIGS. 3 and 4, a disk-shaped tube sheet 162 is bolted to the upper flange 103 of the outer vessel 101. The exterior of each of the first (upper) ends 108 of the tubes 105 is sealingly engaged in a respective bore 163 in the tube sheet 162. Thus, in this embodiment, the liquid inlet nozzle assembly 161 is external to outer vessel 101 and also forms the pressure containing gas exhaust piping that allows gas to exit the apparatus.

Figure 13B:
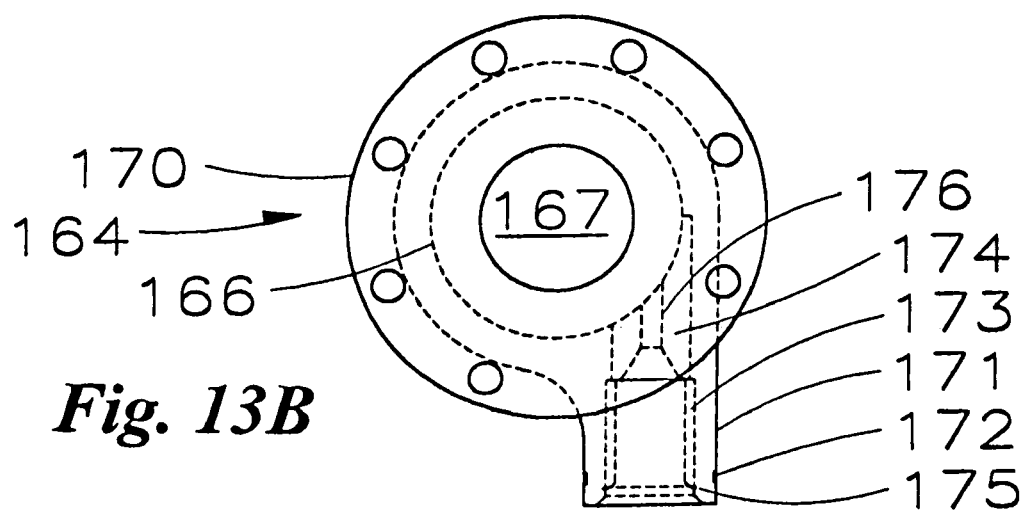
FIGS. 13A and 13B are a partial longitudinal cross-section view and top plan view, respectively, of the liquid inlet nozzle housing of the second embodiment of the invention.
Figure 13A:
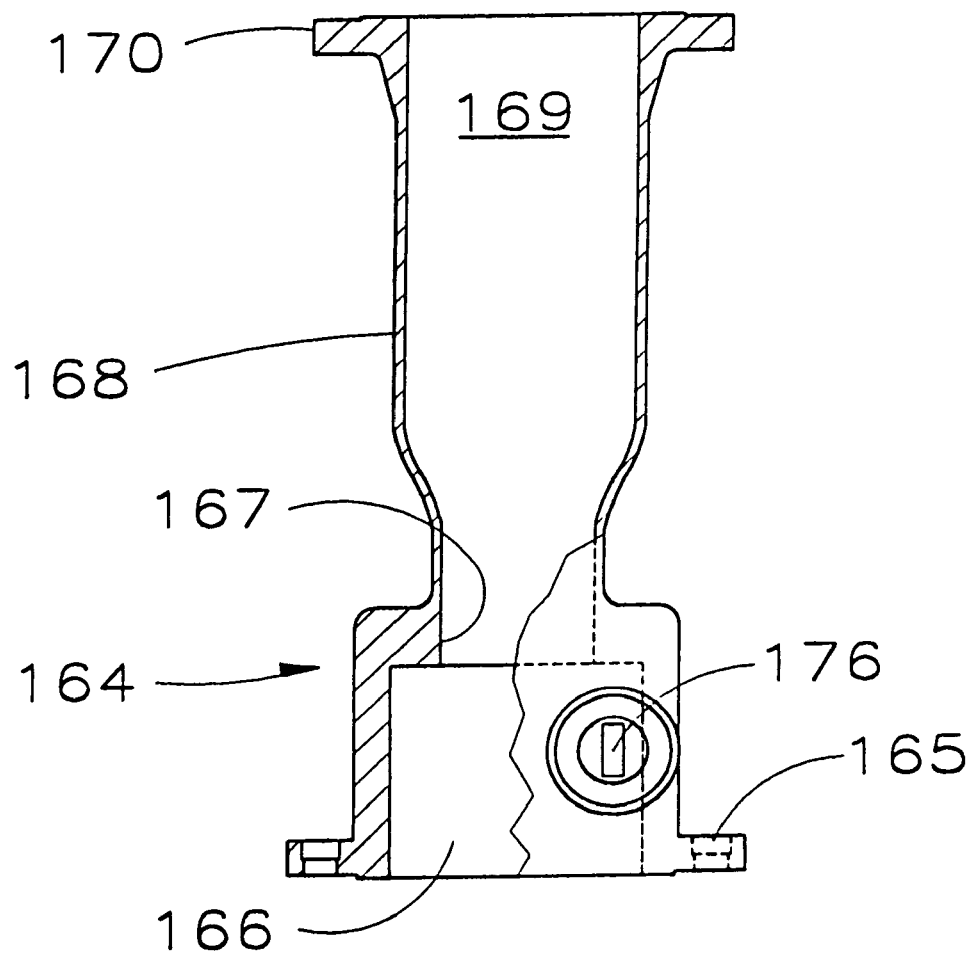
Figure 13C:
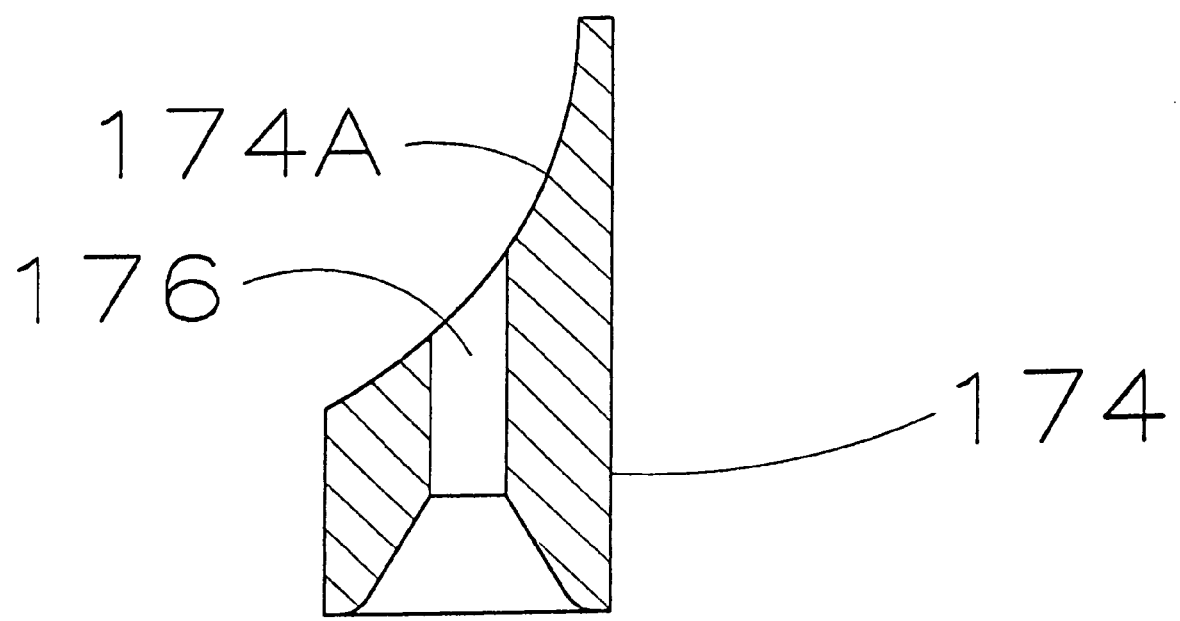
FIG. 13C is a longitudinal cross section view of one of the replaceable nozzle inserts of the liquid inlet nozzle assembly of the second embodiment.

As shown in FIGS. 13A and 13B, each of the nozzle housings 164 of the second embodiment is a generally cylindrical member having a radial flange 165 at its bottom end with bolt holes in a pattern matching threaded holes in the tube sheet 162, a larger interior diameter 166 extending upwardly therefrom with a reduced diameter exhaust opening 167 at its top end in communication with the interior 169 of an elongate exhaust outlet 168 having a radial flange 170 at its outer end through which gas is exhausted. A liquid inlet 171 extends outwardly from the side of the nozzle housing 164 and, as shown here, has a Victaulic-type coupling groove 172 near its outer end, but not limited thereto. The interior of the liquid inlet 171 has a central bore which receives a pair of replaceable nozzle inserts 173 and 174 held in place by a retainer 175. The insert 173 is cylindrical. As best seen in FIG. 13C, the insert 174 has a curved end 174A matching a curved segment of the interior diameter 166 of the nozzle housing 164, and a rectangular inlet aperture 176 configured to establish fluid flow of a thin film of incoming liquid tangential to the side wall of the interior diameter of the nozzle liner 126, as described below. The nozzle inserts 173 and 174 may be made of ceramic materials and be easily replaced periodically in applications having very high fluid velocities and/or erosive solids in the liquid.

The same vortex finder 132 (FIGS. 12A and 12B) and nozzle liner 126 (FIGS. 11A and 11B) described previously above are installed in the interior diameter 166 of each nozzle housing 164. Liquid entering through the inlet 172, passes through the insert 173, the rectangular inlet aperture 176 of insert 174, into the rectangular inlet aperture 130 of the nozzle liner 126, and is trapped by the vortex finder 132 so that liquid can only flow in one direction in a helical flow pattern around the liner 126, through bore 163 in tube sheet 162, into the tube end 108, and further into the porous tube 105.

Referring now to FIGS. 1, 2, 3, 4 and 9, the gas-liquid contactor section 100 of the vessel functions to bring large volumes of gas and liquid into microscopically close contact each with the other, and the gas-liquid separator section 300 (FIG. 9) of both embodiments functions to subsequently separate gas and liquid constituents back apart from each other after having been in contact and after having transferred mass, heat and/or momentum to the extent that thermodynamic and/or chemical equilibrium dictates. The gas-liquid separator section 300 terminates at its lower end with the lower flange 104 of the outer housing 101, which is connected to a flange 178 at the top end of the pressure vessel 177 that serves as the liquid collector section 400 of the apparatus.

As best seen in FIG. 9, the second tube sheet 113 at the lower ends 109 of the tubes 105 forms a part of a gas-liquid separator nozzle assembly. The tube sheet 113 has machined bores 114 that form tube seats for the lower ends 109 of the tubes 105 to both seal and terminate and also provide a continuing path for the helical thin film liquid flow to exit the gas sparged contactor section 100 of the apparatus. The tube sheet bores 114 may be cylindrical or may be tapered, as shown, and as required to accelerate the liquid slightly and serve as a converging nozzle throat to provide a smooth transition zone wherein the 2-phase flow has time to degas and separate as cleanly as possible into a liquid stream and a gas stream (described hereinafter). The length of the degassing zone is arbitrarily chosen in this embodiment as about 8 to 10 liquid film thicknesses or stated another way, about one tube diameter.

Solid target nozzles 179 at the upper end of longitudinal tubular components 180 and 181 are secured in permanent precise position concentrically and axially partially in the bores 114 by supports 182. The design and positioning of target nozzles 179 relative to the converging bore 114 forms an annular gas-liquid separator annulus 183 that allows liquid to pass through and redirects gas in a direction countercurrent to the direction of liquid flow in the contactor section 100 above it. The shape, size and positioning of the target nozzles 179 relative to the converging bores 114 determines the gas-liquid separator efficiency. In the illustrated embodiment, the target nozzles 179 are shown as a simple conical shape, which testing has shown to work effectively. The diameter of the target nozzle 179 is approximately equal to the tube inside diameter minus two liquid film thicknesses. The nozzle as shown does not separate 100% of each distinct phase cleanly and passes a small fraction of gas along with the liquid flowing out of the annulus 183. This inefficiency may be overcome by the addition of gas pressure equalization piping 184 connected in fluid communication between the interior 149 of the gas dome 500 and interior 185 of the liquid collection vessel 177 as shown in FIG. 14 and described hereinafter.

The nozzle supports 182 may be an assembly of round bars or flat bars arranged in a grid, or may take the form of perforated plates where an additional benefit may be derived using the supports additionally as perforated baffle plates to discourage foaming of certain liquids as required for certain processes. Examples of foaming liquids that may be processed with the invention are seawater, crude oil, or any liquid containing surfactants.

The design of the gas-liquid separator section 300 of the apparatus has been determined largely from experimental testing. Two main features should be emphasized here. The contactor section 100 of the apparatus is very sensitive to backpressure and a trade-off exists between gas-liquid separator efficiency and backpressure on the unit. For example, the annulus 183 around the nozzle 179 could be reduced to a dimension less than the liquid film thickness so that only liquid passes through. By doing this, the liquid backs up into the thin film flow and causes the liquid film thickness to expand where, in the limiting case, the porous tubes 105 could become completely flooded with liquid. Thus, it is important to allow generous annular space for liquid to exit the nozzle so that the tubes are never completely flooded with liquid under any steady operating condition. The second feature involved with a slightly inefficient gas-liquid separator nozzle is the desire to limit further contact between the gas and liquid after exiting the contactor section of the vessel. Although the gas at the center 107 of the tubes 105 and the liquid 156 (FIG. 7), as a component of the two phase flow, are in direct contact at the interface 157 created between the central gas column 107 and the annular liquid-gas boundary 157, moving in a longitudinal direction countercurrent to each other, the physical dynamics of the system effectively minimize the possibility of remixing. The area of interfacial contact between the gas at the center 107 of the tubes 105 and the liquid in the two phase flow along boundary 157, across which mass transport might occur, is insignificant in comparison to the area of interfacial contact between the gas bubbles 159 moving through the liquid 156 to the center 107 of the tubes 105. If, however, too much inefficiency exists in the gas-liquid separator, then partitioning between the gas and liquid can reverse a fraction of the mass transfer just completed in the contactor section as the flow moves into the vessel 177 of the liquid collector section 400. It is desirable to arrive at the best design compromise that does not place backpressure on the unit and minimizes the volume of gas escaping with the liquid out of the annulus 183. The annular gas-liquid separator may be further improved by the addition of vanes or other fluid flow control devices whether rotating or non-rotating that serve to improve the efficiency of separation without increasing the backpressure on the contactor section.

Figure 14:
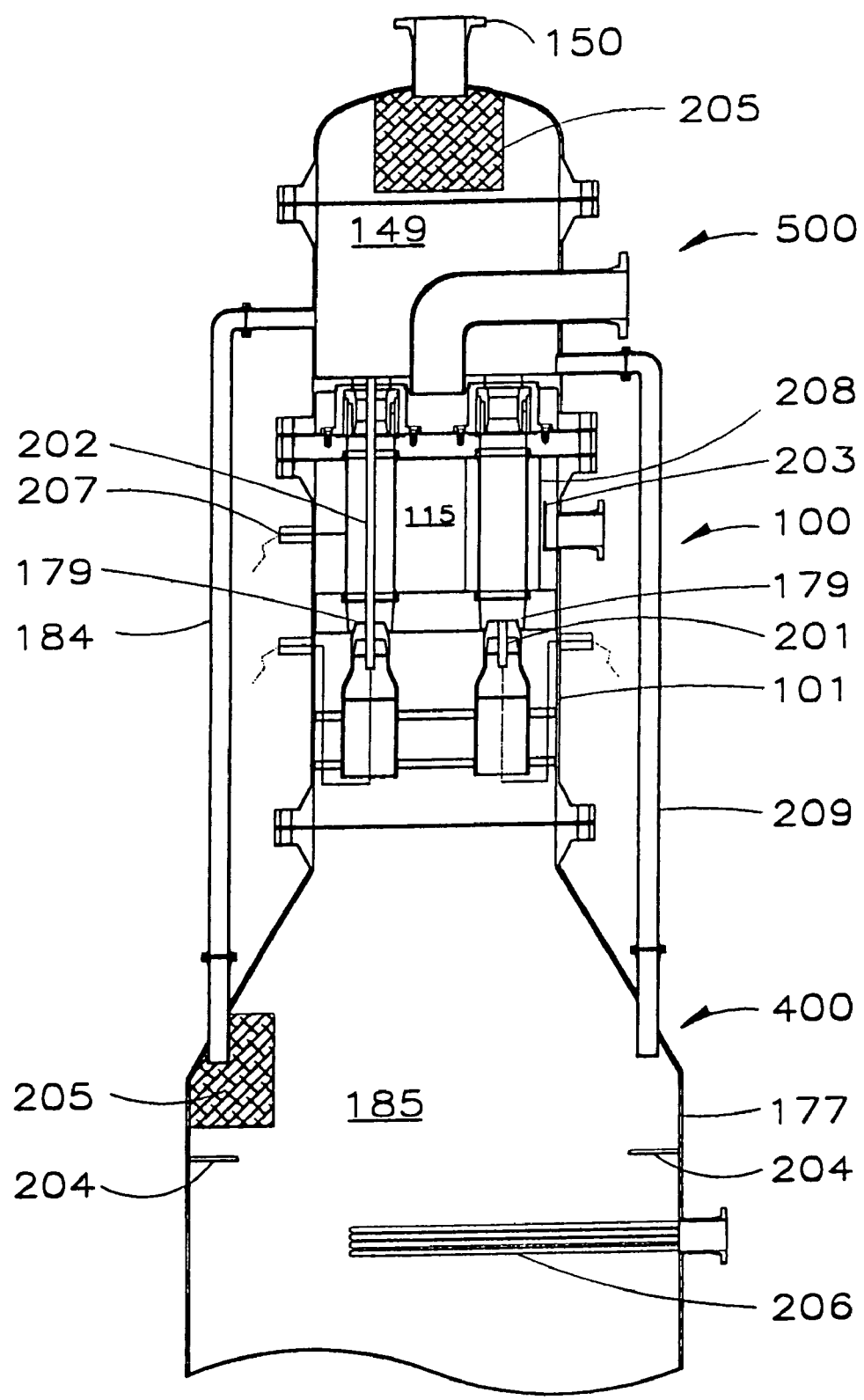
FIG. 14 is a schematic view similar to FIG. 2 with added piping for gas pressure equalization between the liquid collection vessel and the gas dome and several additional components in various sections.

As shown schematically in FIG. 14, another feature of the target nozzle of the present invention is that the solid portion 179 of the target nozzle may be used to house a small measurement or monitoring device 201 such as a camera or opacity monitor, or to provide a mechanical support and electrical termination point for other electronic or electrical devices 202, such as resistance heating elements or ultraviolet emitting light sources in the interior 107 of the tubes 105.

Figure 9A:
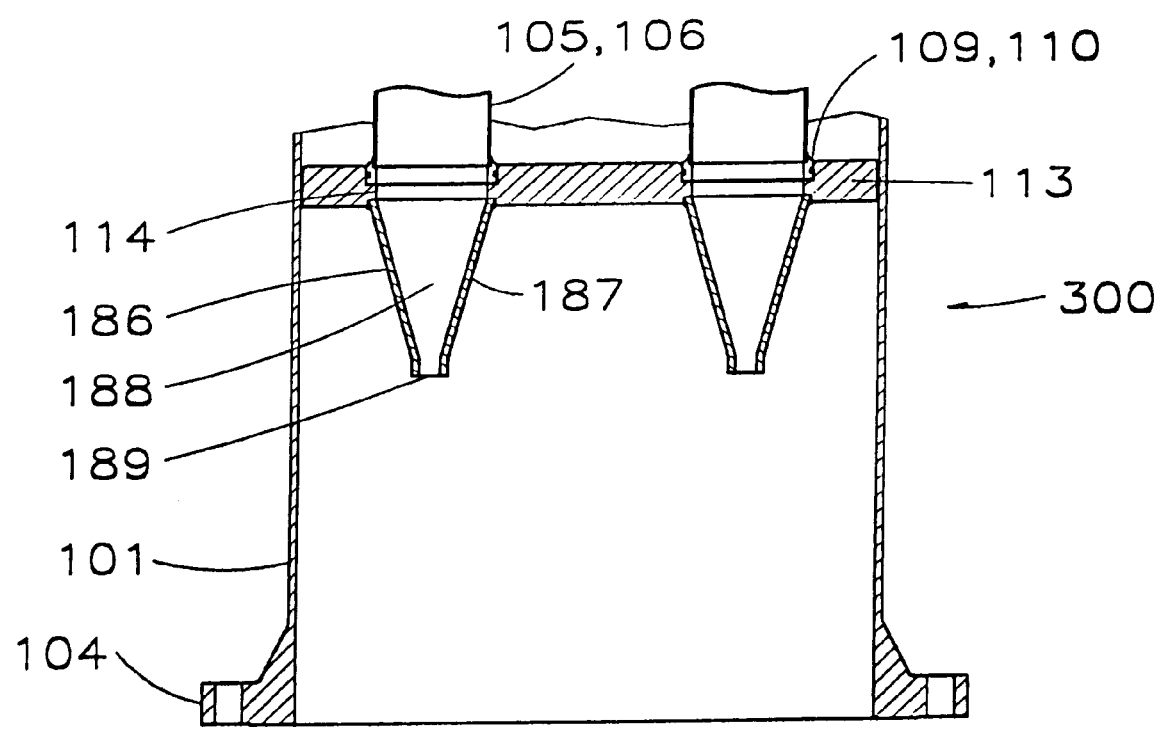
FIG. 9A is an enlarged longitudinal cross-section view of an alternate embodiment of the liquid exit section and a conical liquid separator nozzle assembly that may be used in the first or second embodiments of the apparatus.
Figure 10B:
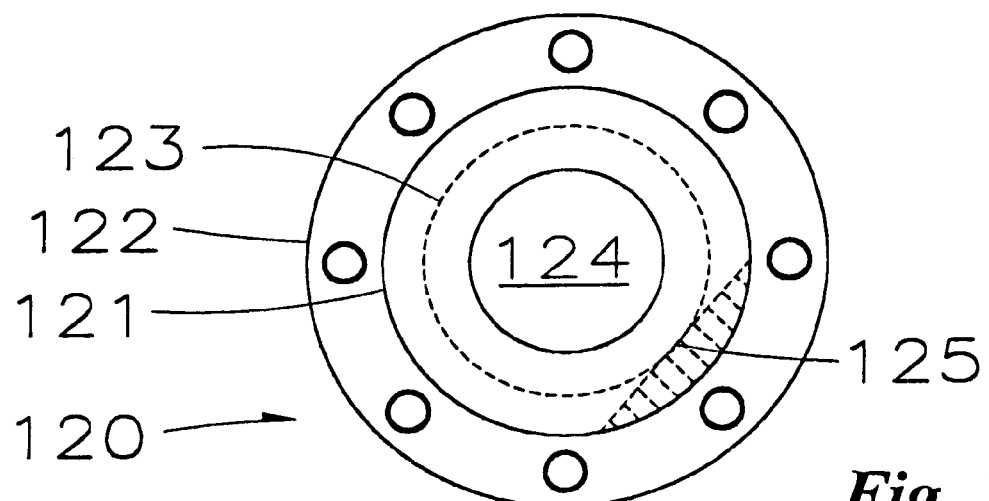
FIGS. 10A and 10B are a partial longitudinal cross-section view and top plan view, respectively, of the liquid inlet nozzle housing of the first embodiment of the invention.
Figure 10A:
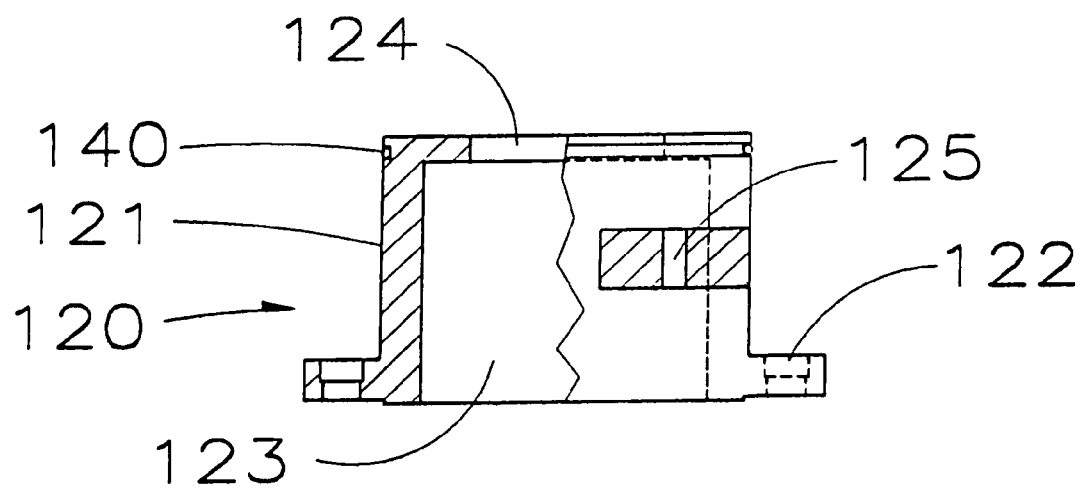

FIG. 9A shows an alternate embodiment of a conical gas-liquid separator 186. The inefficiency of separation, discussed above, may be improved by using a conical or apex nozzle 187 attached to the bottom of tube sheet 113. The apex nozzle 187 provides a simple combination degassing transition zone and gas 'valve' in one flow control shape. The liquid accelerates as it is forced into a converging diameter 188 thereby improving degassing of the liquid. The apex nozzle angle and discharge diameter 189 are carefully chosen to minimize backpressure on the liquid while simultaneously minimizing the amount of gas that can pass through the nozzle. The gas runs into the liquid leading into diameter 189 and due to a very slight pressure build-up, exits in the reverse or countercurrent direction to a zone of lower pressure. One of the main features of the alternate embodiment is its simplicity, the reduced difficulty encountered in the fit-up required to precisely locate an annular target nozzle, and in the added benefit of reducing the thickness of material required to manufacture tube sheet 113.

Certain applications of the apparatus are not adversely affected by completely removing a precision gas-liquid separator nozzle at the termination of the sparging zone. In those cases, tube sheet 113 may be used "as-is" without any further attachments or modification to provide tube seats and a transition zone for the ceasing of gas sparging. In this case, the gas may travel axially in both the co-current and countercurrent directions inside tubes 105 and further may be evacuated from both the upper region of the liquid collection vessel 177 and the exhaust outlet 150 at the top of the gas dome 500.

The liquid collection vessel 177 (FIGS. 2 and 4) that serves as the liquid collector section 400 of the apparatus is a pressure vessel having a flange 178 at its top end connected to the lower flange 104 of the gas-liquid separator section 300 and an interior 185 in fluid communication with the gas-liquid separator chamber 116 beneath the second tube sheet 113 and with the lower ends 109 of the porous tubes 105 through the annulus 183 between the target nozzle 179 and the bores 114 in the tube sheet to receive liquid passing through the annulus. The vessel 177 has a liquid outlet 190 at its bottom end for removing liquid collected therein. The vessel 177 may be manufactured from standard pressure vessel materials and, if necessary, further protected from corrosive service applications by using liner materials or coatings on the inside of the vessel. Certain processes are optimally operated under vacuum. In those cases, the vessel must be designed accordingly to withstand external pressure instead of internal pressure.

Preferably, the governing pressure design basis and the fabrication method and inspection criteria used to construct, test, and operate the present apparatus is in accordance with the American Society of Mechanical Engineers (ASME) Boiler and Pressure Vessel Code (B&PV) Section VIII Division 1 or 2 and/or ANSI/ASME B31.3 Process Piping Code for piping attachments to the vessel.

It should be understood that conventional external vessel hardware commonly required to fabricate, install, start, and safely operate the process, and/or required by code may also be incorporated. These additional attachments are typically vessel nozzles for level gauges/transmitters, extra vessel nozzles in general needed for gauges, meters, switches, vents/drains, pressure safety valves, etc.; along with required manways, davits, lifting lugs, code stamps, nameplates, etc.

The modular tube bundle packaging approach of the present invention allows for several additional features to be incorporated. Consolidating the gas-liquid contactor- and associated hardware needed to house the porous tubes, collect liquid, scrub gas, etc. into a pressure/vacuum vessel allows further use of vessel internal devices like baffles, mist eliminators, vanes, vortex breakers, etc. to improve the overall efficiency of the invention.

For example, as shown schematically in FIG. 14, gas baffles 203 may be provided in the gas supply chamber 115 of the outer housing 101 to prevent the incoming gas stream from impinging directly on the outside surface of a porous element 105 and potentially creating uneven gas distribution to the entire available external surface area of the element. Liquid motion baffles 204 may be provided in the interior 185 of the liquid collection vessel 177 for those process applications where the vessel is mounted on and operates on a moving deck. Gas pressure equalization piping 184 connected in fluid communication between the interior 149 of the gas scrubber section of the gas dome 500 and the interior 185 of the liquid collection vessel 177 may be required in some installations to equalize the pressure between the first ends 108 and the second ends 109 of the porous tube elements 105. As discussed above, the gas-liquid contactor is very sensitive to built-up backpressure. The addition of pressure equalization piping 184 prevents built-up backpressure from occurring in the vessel 177. Mesh pads and/or vane packs 205 may be used in the gas scrubber section 149 of the gas dome 500 and/or at the ends of the gas pressure equalization piping 184 to minimize any entrained liquid carryover prior to the final gas exit 150 from the apparatus. The gas dome 500 provides some gas scrubbing action without the use of additional mist elimination devices by virtue of the decrease in gas velocity as it exits bores 137 of the vortex finders 132 and into the larger volume of the interior 149 of the gas dome 500. The accumulation of liquid in the gas scrubber section 149 of the gas dome 500 may be automatically drained to the vessel 177 through piping attachment 209. Heating elements 206 or a heat exchanger may be provided in vessel 177 to add heat or preheat exchange to the process. Heated gas or heated tubes may be used in some applications to prevent condensable liquids from condensing inside the porous wall of the media due to the pressure drop experienced while flowing through the porous media and/or thin liquid film. For example, the porous media of the tubes 105 may be connected to an electrical source 207 and electrified to additionally serve as a resistance heating element. Polishing filters 208 may be used upstream and/or around each porous element 105 inside the gas supply chamber 115 to provide final polishing filtration for the gas.

Figure 15:
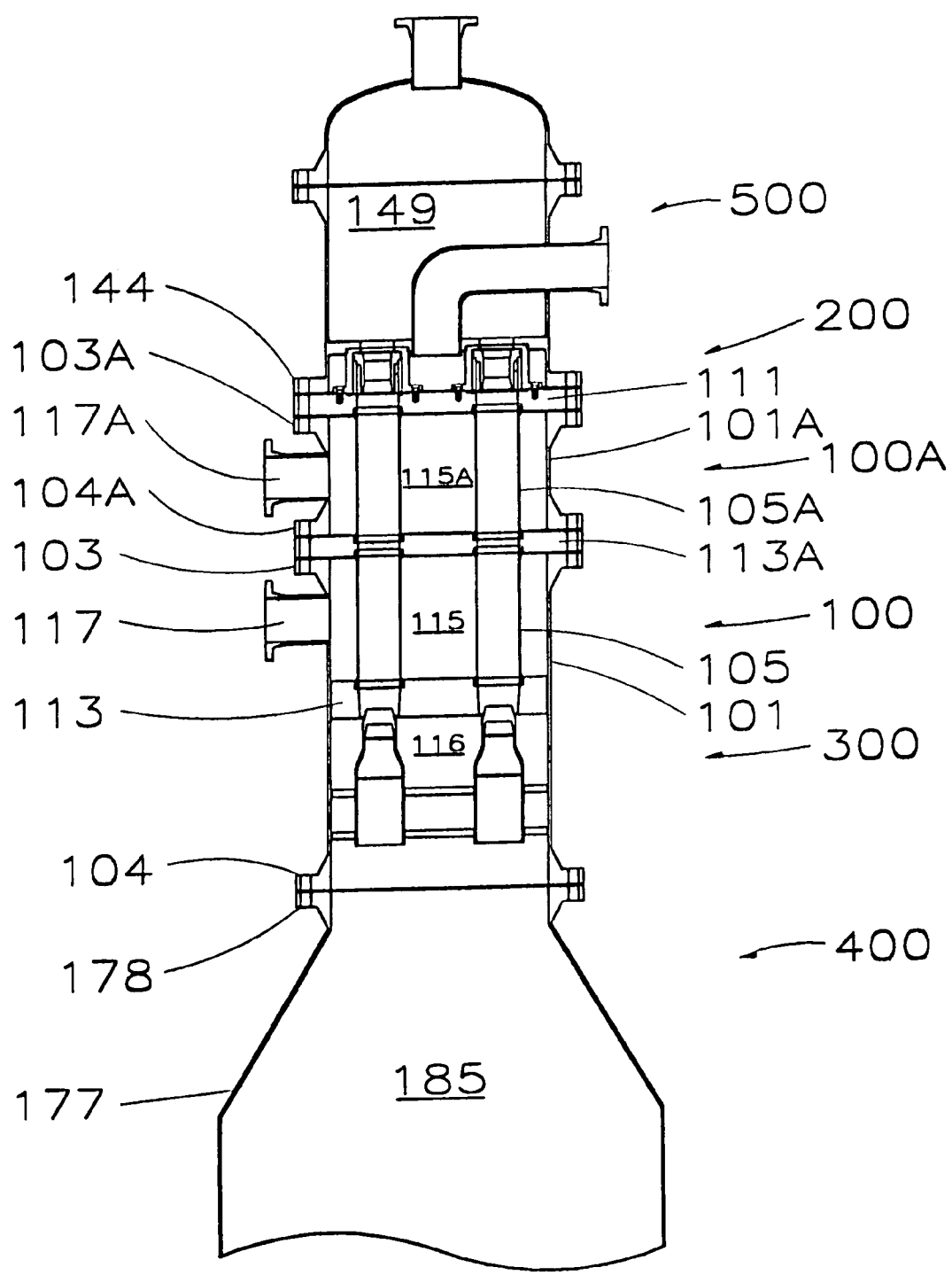
FIG. 15 is a schematic longitudinal cross-sectional view of the first embodiment of the apparatus showing, schematically, an assembly having longitudinally segregated gas-liquid contactor sections.

The modular, bolt together configuration of the apparatus is particularly well suited for utilizing multiple combinations of components. For example, FIG. 15 shows schematically, an assembly wherein an intermediate or second gas-liquid contactor section 100A having all outer housing 101A with upper and lower flanges 103A and 104A is bolted between the outer housing 101 of the first gas-liquid contactor section 100 and the gas dome 500, described above. A plurality of elongate tubes 105A are disposed within the outer vessel 101A and sealingly engaged at their first ends in a respective bore in a first tube sheet 111 bolted between the upper flange 103A of the outer vessel 101A and the flange 144 of the gas dome 500 and their second ends are sealingly engaged in a respective bore in an intermediate tube sheet 113A bolted between the lower flange 104A of the housing 10A and the upper flange 103 of the first vessel 101. Thus, the tube sheets 111, 113A and 113 form a first pressurized gas chamber 115 surrounding the tubes 105 in upper portion of the first vessel 101 and a second pressurized gas chamber 115A surrounding the tubes 105A in the second vessel 101A separated therefrom by the tube sheet 113A, and the second tube sheet 113 forms a gas-liquid separator chamber 116 in the lower portion of the first vessel. The interior of the tubes 105A and 105 are axially and radially aligned and open to liquid flow through the tube sheets such that a smooth flow pattern results. Each outer vessel section 101 and 101A has at least one gas inlet 117, 117A with an interior in fluid communication with the respective gas chambers 115 and 115A for pressurizing it with gas. In a longitudinally stacked contactor configuration of the second embodiment of the invention, either of the gas chambers may be partitioned by plates into multiple segregated pressurized gas chambers each having a respective gas inlet, so that one or more tubes or groups of tubes may be pressure isolated from the other tubes in the bundle and distribution of gas to each tube or group of tubes may be controlled individually.

In this arrangement, the porous tubes 105 and 105A may be selected and dimensioned to provide sufficient tube surface area for the particular application. The tubes or groups of tubes 105, 105A may be selected to isolate pressure along the length of the porous media to achieve uniform gas distribution along the entire length of the contactor sections. The tubes or groups of tubes 105, 105A may also be constructed with different, beneficial shape, porosity and permeability characteristics to enhance gas distribution and liquid film stability along the length of the contactor sections.

It should be understood that the foregoing discussion fully describes examples of components of the various embodiments presented herein, but where practical, the individual parts comprising the flow pathways of the apparatus may be combined into flow control shapes better suited for manufacturing by casting. Where castings are employed in the manufacturing process, the flow pathways may be created using fewer parts than presented herein.

It should be understood that the alternate embodiments and/or two or more of the apparatus may be operated in parallel or in series with each other in the same process train, or in a cascaded, multi-stage process train. For example, FIG. 16A shows, schematically, an arrangement wherein a pair of the assemblies A and B are arranged and operated in series, and a portion of the liquid from the liquid collector vessel 177 of apparatus A is introduced into the liquid inlet 153 of the gas-liquid contactor section 100 of the apparatus B. FIG. 16B shows, schematically, an arrangement wherein a pair of the assemblies A and B are arranged and operated in parallel, and liquid is introduced into the liquid inlets 153 of the gas-liquid contactor sections 100 of apparatus A and B simultaneously. It should be understood that, in parallel operation, gas may also be introduced into the gas inlets 117 of apparatus A and B simultaneously.

The longitudinal axis of the tubes 105 and vessel 101 have been shown and described as being oriented vertically with respect to earth's gravity to more easily comply with industry standard practice for large vessel design, however, it should be understood that the orientation of longitudinal axis of the tube bundle and vessel may be in any orientation that is convenient for efficient apparatus design and manufacturability. The longitudinal axis of the liquid collection pressure vessel 177 may also be oriented horizontally, as shown in FIG. 16B, depending on process requirements, preference and/or on the space available for a particular application.

OPERATION

Figure 7:
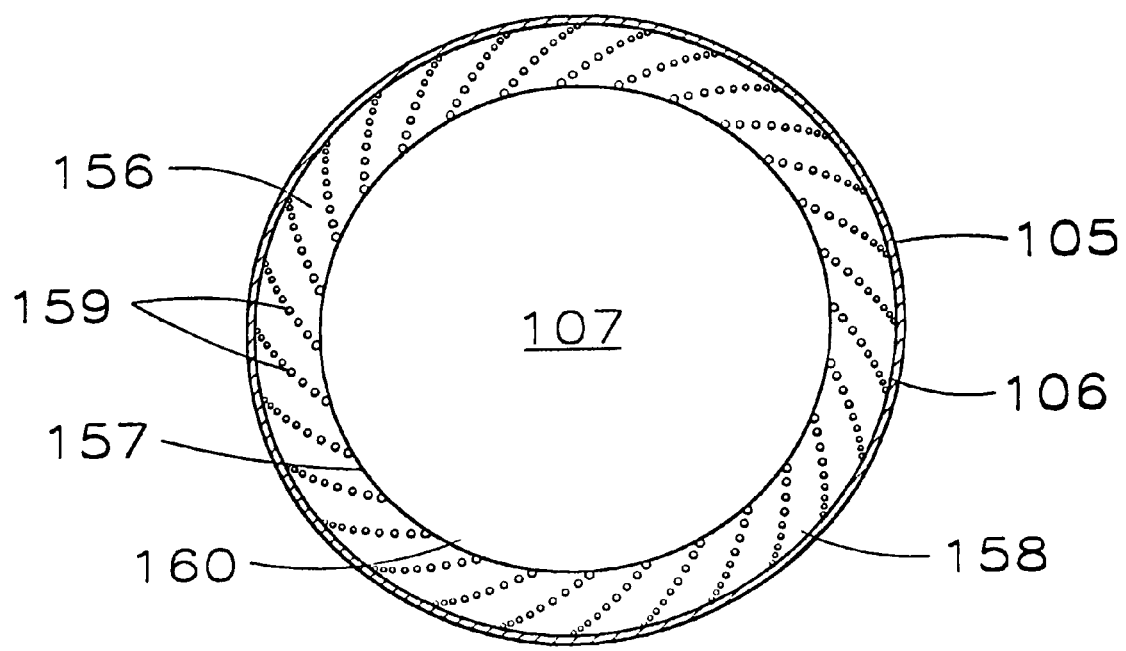
FIG. 7 is an enlarged transverse cross-section view of a porous tube showing, schematically, the features of liquid film and gas bubbles present when the apparatus is in operation.

In operation, liquid is introduced tangentially into the inside diameter 107 of each tube 105 through liquid inlet nozzle assemblies 119 or 161 with sufficient pressure and flow rate to create a high velocity flow of the liquid in a thin film 156, as shown schematically in FIG. 7, around and along the inner surface of the porous side wall 106 of each tube. When the liquid meets the interior of a tube, the inlet velocity vector may or may not be divided into a radial velocity component vector and a longitudinal velocity component vector. The longitudinal velocity vector component may at first introduction of liquid be equal to zero. The addition of a longitudinal velocity vector component, if desired, may be accomplished by controlling the lead angle at which the liquid inlet aperture 130 of the liner 126 (FIG. 11A) is disposed tangentially relative to the inside diameter of the tube. Where the direction of longitudinal flow in the device is approximately in the same direction as earth's gravitational acceleration vector, the lead angle is not particularly required to achieve the desired flow pattern. The earth's gravity will naturally induce a longitudinal downward velocity vector to the liquid film when the tube bundle is arranged vertically and liquid is flowing from top to bottom in the apparatus. The high velocity flow of liquid in a helical pattern around and along the inside walls of the tube produces a centrifugal force of sufficient magnitude, acting to force the liquid against the inner surface of the tube with a velocity vector direction generally normal or perpendicular to the longitudinal axis of the tube. The liquid radial velocity, and thus the outward acceleration, is sufficient to maintain the liquid film against the inner wall surface of the tube throughout its entire length.

Liquid may be introduced into the apparatus using different methods depending on the apparatus configuration. In the first embodiment (FIGS. 1, 2 and 8), liquid under pressure is introduced through the interior 154 of the liquid inlet conduit or pipe 153 into the pressure containing chamber 148 where the liquid flows to all the liquid inlet nozzle assemblies 119 and into all of the porous tubes 105 in the bundle simultaneously. The bulk liquid flow rate introduced in the single inlet pipe 153 is controlled at the overall required capacity and at an adequate pressure ranging from the lowest process design liquid flow rate to the highest process design liquid flow rate, with all tubes in the bundle supplied at the same flow rate and pressure simultaneously. The bulk process fluid flow control method in this configuration allows only one range of process turn-up/turn-down ratio and the whole apparatus with all tubes in the bundle connected is either on or off.

In the second embodiment (FIGS. 3 and 4), each liquid inlet nozzle assembly 161 has a separate liquid inlet 171 (FIGS. 13A, 13B) to supply each porous tube 105 individually, ranging from the lowest design liquid flow rate to the highest design liquid flow rate for one tube of a particular diameter. The process liquid flow rate may be controlled by individually feeding each tube or group of tubes such that one or more tubes or group of tubes may be turned off while other tubes or tube groups are still in operation. Liquid flow control in this configuration allows for sequential ranges or step-wise turn-up/turn-down so that overall a much broader range of process turn-down ratio may be achieved. This method may employ tubes of differing diameters and capacities to cover the overall liquid capacity range and turn-down ratio required by the process.

Pressurized gas is introduced through the inlet 117 (FIG. 4) into the pressure vessel chamber 115 or chambers between the side wall 102 of the outer housing 101 and the outer surfaces of the porous walls 106 of the tubes 105 and forced through the porous walls of the tubes by virtue of the differential pressure between the pressurized gas chamber 115 and the inside diameter 107 of each porous tube. The porous tubes are seated and sealed at each end in the tube sheets 111 and 113 such that the gas can only flow through the porous walls of the tubes. Where liquid flow control exists for each tube or group of tubes individually in the bundle, the gas supply to the same each tube or group of tubes may be individually controlled so that gas is not flowing to a tube or tube group that is out of service. As shown schematically in FIG. 7, the gas passes to the inner surface of the porous side wall 106 of the tube 105 and is immediately contacted by the liquid 156, which is moving at a high velocity relative to the tube wall and to the gas as it enters the interior of the tube. The gas is sheared from the porous wall by a liquid boundary layer 158 moving approximately perpendicular relative to the gas. The result of this introduction of gas through the labyrinth of pores in the porous tubes into a liquid having a centrifugal or outward acceleration in the approximate opposite direction to the gas velocity vector direction is that a multitude of very fine bubbles 159 are produced, and are carried away from the tube wall 106 by the moving liquid 156 in its radial flow pattern around the inner surface of each porous wall 106, and longitudinally toward the liquid exit from each tube.

The mixture of liquid 156 and gas bubbles 159 forms a two-phase flow that exists in a helical flow pattern around and along the inner surface of each tube. The buoyancy of the bubbles 159 relative to the liquid 156 causes them to move toward the region of lowest pressure or the center zone 107 of the tube and against the centrifugal or outward acceleration of the liquid phase, passing through the froth created by the two phase flow as it moves around the inner surface of each tube. The gas exits from the two-phase flow at the inner flow boundary 157 created at the inside diameter of the thin film into a gas boundary layer 160 and is transported axially from the tube. It has been observed in countercurrent operation that the gas core 107 rotates in the opposite direction from the helical liquid flow and as a result, the gas velocity at the gas boundary layer 160 must approach zero and then reverse direction. The effect is like two augers rotating one inside the other in opposing directions.

Because the specific gravity of the liquid is much higher than the specific gravity of the gas, the centrifugal or outward acceleration imposes a substantially higher force on the liquid than on the gas. The gas is thus able to move to the center 107 of the tube 105 while the liquid is forced toward the wall 106 of the tube. The result of this density difference produces a distinct gas phase in and along the axial core of each porous tube, minimizing liquid entrainment with the gas in the central portion of the tube, and inducing a clean separation between the gas column at the center of the tube and the two phase flow along the inside diameter surface of the tube.

As the bubbles 159 pass through the liquid 156, momentum, heat and mass are transferred on a molecular level between the liquid and the gas in accordance with the laws of thermodynamic equilibrium. Mass transfer occurs between the two components as determined by the value of the appropriate partition coefficient and the initial concentration of the transferring component in each phase. In general, the concentrations of the transferring component in each bubble of gas 159 and in the immediately surrounding liquid 156 are at or closely approaching equilibrium when the gas in each bubble exits from the gas boundary layer 160 and bursts into the gas column 107 at the center of the tube. Each volume of gas passes through the liquid only once within the apparatus, and each passage is associated with an approach to equilibrium. Each passage is conceptually related to a McCabe-Thiele Method theoretical plate.

As a general, and non-limiting example, consider an apparatus within the scope of the invention in which the inside diameter 107 of tube 105 is 142 mm (5.59 inches) and has a porous wall thickness of 3.5 mm (0.138 inch), and is formed of a commercially available porous media, for this example, sintered 316L grade stainless steel having an average pore size of 10 microns. It should be understood that the apparatus is modular and scalable. In this example, the starting annular area occupied by the undisturbed liquid film is one-third of the cross-sectional area of tube 105 interior cross-sectional area, yielding a liquid film thickness of 0.513 inches. The rectangular dimension of the liquid inlet aperture 130 or 176 is 0.513 inches in width by 1.443 inches long. The porous tube 105 is 19.38 inches long end-to-end between the tube ends 108 and 109 and has an effective gas sparging length of 16 inches. There are 4 tubes in the apparatus of the example. Taking 16/1.443 gives about 11 possible liquid revolutions per tube if a perfect helix is maintained through the sparged length. In practice, the helix lead angle from one revolution of liquid to the next revolution of liquid decays or becomes larger regardless of tube orientation with respect to earth's gravity. The actual number of revolutions of liquid is closer to 6 or 8. From experimental work, an example liquid flow rate for this geometry is about 200 gallons per minute (gpm) per tube or about 800 gpm total apparatus liquid flow nominal capacity. This flow rate yields a liquid inlet nozzle velocity=q/A, where q=flow rate in ft$^3$/s and A=flow area in ft$^2$; of 86.7 ft/s, corresponding Reynolds Number for 60° F. water and using the hydraulic diameter of a rectangular nozzle, of 449,381. The radial acceleration introduced tangentially into the porous tube 105 at a flow rate of 200 gpm will be 1,002 g or 32,275 ft/s$^2$. Also from experimental work, this particular flow geometry exhibits liquid film stability over a usable range from about 125 gpm to about 580 gpm. If Reynolds Number=1×10$^6$ is imposed as a limiting design parameter for the liquid inlet nozzle, then this range may be limited to about 445 gpm. The range from 125 gpm to 445 gpm inclusive may or may not yield the desired process results and depends entirely on the process objective of interest. From a purely fluid mechanics point of view, the stable range of operation, in this non-limiting example, corresponds to nozzle velocities from 54 to 193 ft/s, Reynolds Numbers from 280,931 to 1×10$^6$, and radial accelerations from 392 g to 4966 g.

To illustrate the tremendous flexibility of the modular design of the present invention, consider changing one component, the liquid inlet aperture 130 or 176, from a length of 1.443 inches to 1.026 inches or exactly 2 times the film thickness of 0.513 in the above example and keeping all other geometry and flows the same. The effect from just this one alteration changes the entire range of operation. For example, if 392 g is for some reason determined to be the magical target number for radial acceleration, the corresponding minimum liquid flow rate can now be lowered to about 89 gpm with corresponding number of liquid revolutions now increased to a maximum of 15.5. The net effect in the altered nozzle is to maintain the same hydrodynamic stability of liquid flow while simultaneously reducing the liquid flow rate and keeping the liquid in contact with a larger volume of gas for a longer time. This is just one of many parametric scaleable design parameters.

Now consider the gas side of the above example. Going back to the 1000 g, 200 gpm example, the gas flow rate, determined experimentally by correlation of flow density in scfm (standard cubic feet per minute) per ft$^2$ of external tube surface area, is about 130. The example is considering a 16 inch gas sparging length per tube. The external tube surface area is 2.05 ft$^2$. At a flow density or flux of about 130, this yields a gas flow rate of about 268 scfm per tube 105 for a total gas capacity of 1072 scfm. Consider that the gas is air.

A further correlation discovered by a combination of experimentation and calculation, suggests that the gas pressure required to balance the centrifugal acceleration of water trying to escape out of the porous tube is just simply F=ma. Consider 1 square inch of water having thickness 0.513 inches. The acceleration is 1000 g. The water has a weight density of 62.4 lb/ft$^3$. This calculation yields a force or equivalent gas pressure of 18.52 lb/in$^2$. If the gas pressure is 18.52 psi, then the volume at actual conditions can be calculated using the ideal gas law, p1*v1/t1=p2*v2/t2 where p is pressure, v is volume and t is temperature. The actual gas volume is 268 scfm compressed to 18.52 psi or 118.6 acfm (actual cubic feet per minute). 200 gpm/7.48 gallons per ft$^3$=26.74 ft$^3$/minute of liquid flow.

This result indicates that the example has a volumetric gas to liquid ratio of 10 on a standard basis and 4.44 on an actual basis. This correlation, albeit overly simplistic, agrees very closely with experimental data measured for four different 10 micron tube diameters and corresponding flow rates. Since the design bases were all similar, the correlation applies to 1000 g operation in a 10 micron tube where the liquid occupies ⅓$^{rd}$ of the cross-sectional area of the porous tube. In practice, the gas pressure required to balance the liquid at the inside boundary of the tube increases slightly with increasing liquid centrifugal acceleration. By extrapolation of experimental flow data, it is contemplated that the porous tube of the example will flow about 500 acfm at 50 psig differential measured across the porous media. This high volume gas flow yields gas to liquid ratios of 82 standard and 18.7 actual respectively. This differential pressure is published by the manufacturer as the practical limit of the porous media of the example. It is not known at this time if this is a practical limit of operation of the invention or whether this gas flow would blow the liquid film off the wall of the porous tube. From experience, it appears that if the liquid film has enough centrifugal energy, particularly in a short section of tube, it is not possible to disrupt the liquid flow by sparging too much gas to the extent that the rifle barrel flow pattern disintegrates into chaos.

Now consider changing the tube porosity to 15 micron and leaving all other parameters the same. The result of this change will allow more gas flow at a lower differential pressure and produce larger bubbles having less residence time in the contactor. It is contemplated that real applications exist where this mode of operation would be practical and would produce excellent performance.

To complete the mental picture of the example, the exemplary present contactor has 4 tubes each having a nominal process capacity of about 200 gpm. The turn-down ratio may be about 175 to about 285 gpm with corresponding gas flows ranging from about 230 to about 400 scfm. This gives an overall nominal flow capacity of 800 gpm liquid and about 1000 scfm gas. In the first embodiment (FIGS. 1 and 2), the turn-down may be a bulk turn-down 700 to 1140 gpm, or in the second embodiment having individually operated tube modules (FIGS. 3 and 4), the turn-down can range from one tube at 175 gpm to all tubes in service at 1140 gpm. Generally, processes do not require 100% turn-down.

In our example, the contactor section of the vessel has a ⅜" wall thickness and is 30 inches in diameter with ANSI 150 lb flanges. The maximum working pressure would be about 200 psig at 200° F. The liquid inlet pressure would be about 75 to 80 psig with gas inlet pressure of about 18 to 20 psig. The liquid hold-up volume in liquid collection vessel 177 is about 1000 gallons with cylinder seam to seam about 8 ft and diameter about 5 feet. The bottom vessel head is a standard ASME 2:1 elliptical flanged and dished head. The overall height of the first embodiment (FIGS. 1 and 2) is about 21'-3", and the second embodiment (FIGS. 3 and 4) about 18'-10". The same apparatus configuration can hold up to 5 tubes in the bundle. The tubes 105 can be longer or shorter than 16 inches of effective sparging length. The gas supply nozzle, gas exit, liquid inlet and liquid exit of the first embodiment would all be 6" Schedule 40 pipe.

The liquid surface area generated in the example of the apparatus is approximately 693,000 square feet assuming the maximum number of bubbles at atmospheric pressure using the nominal capacities. This corresponds to a surface area per unit volume of gas-liquid contact generated in 0.9 cubic feet of porous tubes of about 770,000 $ft^2/ft^3$. Stated another way for better visualization, if the liquid having thickness 0.513 inches and exposed surface 1.443 inches wide was stretched out in a small channel on the ground, the distance would need to be about 1091 miles long to yield the equivalent surface area exposed to air as is illustrated in this example.

The comparison of the above example to the Reynolds Number discussion in the Background of the Invention for a process capacity of 3000 gpm can now be made. The example above illustrates the design flexibility and modular approach of the invention. The scale-up from the example discussion of a nominal 200 gpm capacity to 3000 gpm would require 12 tubes of this particular diameter operating at 250 gpm each. The vessel cylinder size required to contain 12 tubes is 54" in diameter. This is less than twice the 30" diameter needed to house 4 tubes. Alternatively, the scale-up to a 3000 gpm process capacity may be accomplished with a fewer number of larger diameter tubes than as presented in the example. The economy of scale of full commercial implementation of this invention lies in the ability to standardize on perhaps 2 or 3 tube diameters and consequently 2 or 3 sizes of liners, nozzles, seals, and other custom parts that comprise a full assembly. The huge economies available lie further in the ability to minimize the required pipes, valves, meters, switches, etc., which comprises a full industrial process system complete with automatic operator interface, safety alarms and shut-downs.

It should be understood from the foregoing discussion that the preferred method of the present invention performed in the apparatus as disclosed and described, comprises the following general steps:

1. introducing a stream of liquid tangentially to the first end of a bundle of porous cylindrical or conical tubes;
2. controlling the flow of a thin film of the liquid in a spiral pattern around and along the inner surface of each porous tube from the first end to the second end, so as to impose centrifugal or outward accelerations within the range of about 2 g to about 8000 g on the liquid at the inner surface of the porous tube;
3. sparging a gas through the wall of each porous tube and through the liquid spiraling through each tube at an overall gas to liquid volumetric flow ratio of up to the maximum rated differential pressure measured across each tube, whereby the overall gas to liquid flow rate is divided into a number of individual transfer units in which the interfacial contact area between gas and liquid is extremely large, whereby highly efficient transport between liquid and gas is achieved;
4. ceasing sparging of gas into the liquid in a region adjacent to the second end of each tube while allowing the liquid to continue spiraling toward the second end of each tube for a sufficient distance and time to allow degassing of the liquid and separation of the gas and liquid into an annular film of liquid around the inner circumference of each tube and a column of gas at the center of each tube;
5. physically dividing liquid from gas at the second end of each tube by interposing two cylindrical nozzles thus creating an annular nozzle where liquid exits the second end and gas is either redirected to the first end or allowed to escape from both ends;
6. redirecting the columns of gas back to the first ends of each tube in countercurrent flow relative to the movement of liquid along each tube or allowing a combination co-current/countercurrent mode of operation where gas travels toward the first ends and second ends of each tube;
7. removing the gas from the apparatus through cylindrical nozzles at the first ends and/or second ends of the apparatus; and
8. removing the liquid from the apparatus.

The apparatus is preferably operated such that liquid does not wet the porous media. If the liquid is clean, then the tubes can be purged and dried adequately to recover from becoming wetted. If the liquid contains particulate matter, the tubes may become plugged from the inside and gas will no longer flow through the media. Generally, in practice, the tubes should be checked and/or replaced on a regular basis. The overall gas flow control system contemplated for use in industrial applications of the present invention will incorporate alarms and start-up/shut-down sequences including automatic gas purge and be based on gas flow and acceptable differential pressure across the porous media to protect the tubes from becoming unusable.

Corrosive liquids may be processed using the present method and the components constructed of appropriate materials for the particular application, such as exotic metal alloys, plastics, other non-metallic components, compatible sealing elements, linings, coatings, etc. or combinations thereof. The modular, bolt together form of the apparatus is particularly well suited for utilizing combinations of materials and components selected for the most cost effective implementation of the method.

For applications requiring very high process pressures, the apparatus can easily be adapted to use heavier walled steel components, for high temperatures—thermal insulation, for dangerous materials—double wall containment.

The operating parameters of the method of the present invention are selected with the objective of optimizing the overall transport efficiency in the gas-liquid system of interest, generally that of mass transfer, and thus the overall operating efficiency of the apparatus. Widely different objectives may exist with the application of the invention, and parameters may be developed on a process-by-process basis. For example, deoxygenation of seawater, requires only approximately a 1:1 up to 4:1 gas to liquid volume ratio (GLR) to strip oxygen out of the seawater. For ozonation, hydrogenation or in general, some chemical processes, the stoichiometric ratios may be very small to accomplish the objective and only require a GLR of less than 1. For this type of operation utilizing small GLR, the present apparatus and method may utilize short, tight porosity porous tubes to simultaneously satisfy the process requirements and maintain the dynamic requirements of flow and liquid film stability. Where the required process gas volume is too low to maintain the dynamic requirements, an inert carrier gas can be used with the process gas to increase the overall gas volume supplied to the invention.

For those processes where gas production and volume throughput are tantamount to successful application of the invention, the system may be configured to operate with large gas to liquid volume ratios. In this case, the apparatus and method may utilize longer, looser porosity porous tubes in greater number in the bundle to provide enough tube surface area for the required process gas flow. The porous tube media may be segmented to isolate pressure along the length of the porous media to achieve uniform gas distribution along the entire length of the contactor and/or the media may be constructed using a conical cross-section to improve the uniformity of the gas distribution. If the media is segmented along its length, each segment may be constructed with different, beneficial shape, porosity and permeability characteristics to enhance gas distribution and liquid film stability along the length of the contactor. If the porous media has a conical cross-section, the porosity and permeability characteristics may be engineered to achieve controlled linear or parabolic gas distribution characteristics along the length of the contactor media and/or media segments. In the limit, the present apparatus can flow as much gas as will produce the maximum rated differential pressure measured across the porous media from the gas supply side to the gas exhaust side and is further limited by the sonic velocity of compressible gas flowing through the porous media and by the sonic velocity of gas exiting the gas exit nozzle assembly and out of the apparatus. Conical cross-section contactor sections in the invention may also be used to increase the gas exit nozzle throat dimension in the limiting case of sonic gas flow.

Depending upon the particular application, liquid is introduced to the apparatus at the lowest possible flow rate to sustain the dynamic requirements of flow and liquid film stability along the tube length. Where short, tight porosity tubes are employed, the liquid radial acceleration may be very low, say 2 to 10 g. Where longer tubes are employed, the liquid radial acceleration may exceed the 1500 g design basis of prior art devices. The overall ratio of gas to liquid volumetric flow rate expressed at standard temperature and pressure conditions may vary widely from about 1:1 up to the maximum rated differential pressure measured across the porous media. Depending on the gas employed, this differential pressure may produce a GLR greater than 50:1.

The modular configuration of the present invention allows parameters to be adjusted for the most efficient operability range including broad turn-up/turn-down ratios that invariably have to be considered and incorporated. The modularity of the present invention allows reduction of studies in process design, mechanical design, and cost accounting to determine the initial best tube diameter/length ratio versus tube number to roughly size for the operability range of the process. The process performance may be fine-tuned by simply adding or subtracting a tube from service. Tube porosity and tube length, liquid film thickness, gas outlet nozzle diameter, etc. can each be changed out in total or in selected contactors in the bundle.

Thus, the present invention has significant differences and advantages over the prior art, and has the potential to perform a large variety of industrial processes very efficiently and economically and further to perform complex multi-component or multi-stage processes including reactive processes which may not be possible to perform on a large scale using other conventional methods. Moreover, a principle advantage of the present apparatus is the ability to construct large economic process capacity completely contained inside relatively simple standardized pressure/vacuum vessels.

It should be understood that although the apparatus has been presented primarily as a gas-liquid contactor it works equally well in certain applications as a gas—gas contactor or a liquid—liquid contactor. Where a density gradient exists between two components regardless of phase, the acceleration present in the tube sections causes lighter components to separate from heavier components.

While this invention has been described fully and completely with special emphasis upon preferred embodiments, it should be understood that within the scope of the appended claims the invention may be practiced otherwise than as specifically described herein.

What is claimed is:

1. A method for contacting large volumes of gas and liquid across a multitude of microscopic interfaces, comprising the steps of:

providing an outer vessel having a central longitudinal axis circumscribed by a non-porous generally cylindrical side wall with first and second ends, and a plurality of elongate tubes within said outer vessel disposed in circumferentially spaced relation having longitudinal axes parallel to and radially spaced from said outer vessel longitudinal axis, each of said tubes having a microscopically porous side wall with an inner surface surrounding a hollow interior and opposed first and second ends, said outer vessel sealed around said first and second ends of said tubes to form a pressurized gas chamber surrounding said tubes;

introducing a stream of liquid into the first end of said plurality of tubes tangential to the inner surface thereof;

controlling the flow of a thin film of the liquid in a spiral pattern around and along the inner surface of each of said plurality of tubes from said first end to said second end, so as to impose centrifugal accelerations on the liquid on the inner surfaces thereof;

sparging a gas through the porous side wall of each of said plurality of tubes and through the liquid spiraling therethrough at an overall gas to liquid volumetric flow ratio of up to a maximum rated differential pressure measured across each tube, whereby the overall gas to liquid flow rate is divided into a number of individual transfer units in which the interfacial contact area between gas and liquid is extremely large, whereby highly efficient transport between liquid and gas is achieved.

2. The method according to claim 1, comprising the further step of:

ceasing sparging of gas into the liquid in a region adjacent to said second end of each of said plurality of tubes while allowing the liquid to continue spiraling toward said second end for a sufficient distance and time to allow degassing of the liquid and separation of the gas and liquid into an annular film of liquid around the inner surface of each of said plurality of tubes and a column of gas at the center thereof.

3. The method according to claim 2, comprising the further steps of:

separating the liquid from the gas at said second end of each of said plurality of tubes;

discharging the separated liquid from said second end; and redirecting the separated gas to said first end.

4. The method according to claim 2, comprising the further steps of:

separating the liquid from the gas at said second end of each of said plurality of tubes;

discharging the separated liquid from said second end; and redirecting the separated gas to either of said first ends and second ends of said plurality of tubes.

5. The method according to claim 1, wherein
said pressurized gas chamber of said outer vessel is divided into a plurality of segregated pressurized gas chambers each having a gas inlet for introducing gas therein, and each of said elongate tubes is disposed within a respective one of said pressurized gas chambers; and
said step of sparging a gas through the porous side wall of each of said plurality of tubes and through the liquid spiraling therethrough comprises supplying gas to each of said plurality of tubes individually at selected pressures.

6. The method according to claim 1, wherein
said step of introducing a stream of liquid to said first end of said plurality of tubes tangential to the inner surface thereof comprises introducing a stream of liquid tangentially into said interior of each of said tubes individually at selected velocities.

7. A method for contacting large volumes of gas and liquid across a multitude of microscopic interfaces, comprising the steps of:
providing an outer vessel having a central longitudinal axis circumscribed by a non-porous generally cylindrical side wall with first and second ends, and a plurality of elongate tubes within said outer vessel disposed in circumferentially spaced relation having longitudinal axes parallel to and radially spaced from said outer vessel longitudinal axis, each of said tubes having a microscopically porous side wall with an inner surface surrounding a hollow interior and opposed first and second ends, said pressurized gas chamber of said outer vessel divided into a plurality of segregated pressurized gas chambers each having a gas inlet for introducing gas therein, and each of said elongate tubes disposed within a respective one of said pressurized gas chambers;
introducing a stream of liquid into the first end of selected ones of said plurality of tubes tangential to the inner surface thereof at selected velocities;
controlling the flow of a thin film of the liquid in a spiral pattern around and along the inner surface of each of said selected ones of said plurality of tubes from said first end to said second end, so as to impose centrifugal accelerations on the liquid on the inner surfaces thereof;
sparging a gas through the porous side wall of each of said selected ones of said plurality of tubes and through the liquid spiraling therethrough at an overall gas to liquid volumetric flow ratio of up to a maximum rated differential pressure measured across each tube, whereby the overall gas to liquid flow rate is divided into a number of individual transfer units in which the interfacial contact area between gas and liquid is extremely large, whereby highly efficient transport between liquid and gas is achieved.

8. The method according to claim 7, comprising the further step of:
ceasing sparging of gas into the liquid in a region adjacent to said second end of each of said selected ones of said plurality of tubes while allowing the liquid to continue spiraling toward said second end for a sufficient distance and time to allow degassing of the liquid and separation of the gas and liquid into an annular film of liquid around the inner surface of each of said selected ones of said plurality of tubes and a column of gas at the center thereof.

9. The method according to claim 8, comprising the further steps of:
separating the liquid from the gas at said second end of each of said selected ones of said plurality of tubes;
discharging the separated liquid from said second end thereof; and
redirecting the separated gas to said first end thereof.

10. The method according to claim 8, comprising the further steps of:
separating the liquid from the gas at said second end of each of said plurality of tubes;
discharging the separated liquid from said second end; and
redirecting the separated gas to either of said first ends and second ends of said plurality of tubes.

11. A method for contacting large volumes of a first fluid of lighter density and a second fluid of heavier density across a multitude of microscopic interfaces, comprising the steps of:
providing an outer vessel having a central longitudinal axis circumscribed by a non-porous generally cylindrical side wall with first and second ends, and a plurality of elongate tubes within said outer vessel disposed in circumferentially spaced relation having longitudinal axes parallel to and radially spaced from said outer vessel longitudinal axis, each of said tubes having a microscopically porous side wall with an inner surface surrounding a hollow interior and opposed first and second ends, said outer vessel sealed around said first and second ends of said tubes to form a pressurized chamber surrounding said tubes for receiving the first fluid of lighter density;
introducing a stream of the second fluid of heavier density into the first end of said plurality of tubes tangential to the inner surface thereof;
controlling the flow of a thin film of the second fluid of heavier density in a spiral pattern around and along the inner surface of each of said plurality of tubes from said first end to said second end, so as to impose centrifugal accelerations on the second fluid on the inner surfaces thereof;
sparging the first fluid of lighter density through the porous side wall of each of said plurality of tubes and through the liquid spiraling therethrough at an overall lighter density fluid to heavier density fluid volumetric flow ratio of up to a maximum rated differential pressure measured across each tube, whereby the overall lighter density fluid to heavier density fluid flow rate is divided into a number of individual transfer units in which the interfacial contact area between lighter density fluid and heavier density fluid is extremely large, whereby highly efficient transport between the first fluid of lighter density and the second fluid of heavier density is achieved.

12. The method according to claim 11, comprising the further step of:
ceasing sparging of the fluid of lighter density into the fluid of heavier density in a region adjacent to said second end of each of said plurality of tubes while allowing the fluid of heavier density to continue spiraling toward said second end for a sufficient distance and time to allow lighter components to separate from heavier components into an annular film of heavier density fluid around the inner surface of each of said plurality of tubes and a column of lighter density fluid at the center thereof.

* * * * *